US012750249B2

(12) United States Patent
Kanovitz et al.

(10) Patent No.: US 12,750,249 B2
(45) Date of Patent: Sep. 29, 2026

(54) SECURE RETRIEVAL OF OFF-NETWORK DATA BY TRUSTED NETWORK ENTITIES

(71) Applicants: Michael Ira Kanovitz, Chicago, IL (US); Jon Isaac Loevy, Chicago, IL (US)

(72) Inventors: Michael Ira Kanovitz, Chicago, IL (US); Jon Isaac Loevy, Chicago, IL (US)

( * ) Notice: Subject to any disclaimer, the term of this patent is extended or adjusted under 35 U.S.C. 154(b) by 39 days.

(21) Appl. No.: 18/856,698

(22) PCT Filed: Apr. 14, 2023

(86) PCT No.: PCT/US2023/018635

§ 371 (c)(1),
(2) Date: Oct. 14, 2024

(87) PCT Pub. No.: WO2023/201032

PCT Pub. Date: Oct. 19, 2023

(65) Prior Publication Data

US 2025/0254053 A1 Aug. 7, 2025

Related U.S. Application Data

(60) Provisional application No. 63/356,295, filed on Jun. 28, 2022, provisional application No. 63/343,279,
(Continued)

(51) Int. Cl.
*H04L 29/06* (2006.01)
*H04L 9/00* (2022.01)
(Continued)

(52) U.S. Cl.
CPC .............. *H04L 9/50* (2022.05); *H04L 9/3236* (2013.01); *H04L 67/104* (2013.01)

(58) Field of Classification Search
CPC .. G06F 21/62; G06F 21/6209; G06F 21/6218; G06F 21/6227; G06F 21/64;
(Continued)

(56) References Cited

U.S. PATENT DOCUMENTS 10,621,579 B2 4/2020 Perullo
10,693,654 B2 6/2020 Thompson
(Continued)

FOREIGN PATENT DOCUMENTS

CN 110532359 A 12/2019
CN 110648204 A 1/2020
(Continued)

OTHER PUBLICATIONS

International Search Report and Written Opinion, PCT Application PCT/US2024/039546, mailed Dec. 4, 2024.
(Continued)

*Primary Examiner* — Malcolm Cribbs
(74) *Attorney, Agent, or Firm* — McDonnell Boehnen Hulbert & Berghoff LLP

(57) ABSTRACT

Methods and systems for carrying out secure retrieval of off-network data are disclosed. A computing system configured for operating as a validator node of a network of nodes operating a decentralized network may be selected to securely retrieve off-network data for the decentralized network responsive to successfully validating a new data block of the decentralized network. The computing system may then retrieve a queue entry from a queue, and determine from the queue entry a data source of the off-network data. The computing system may then retrieve the off-network data from the data source, generate a cryptographic verification that it carried out the retrieval of the off-network data, and store the cryptographic verification in a verification data structure configured for providing authorization for data
(Continued)

entries to be included in future data blocks of the decentralized network.

16 Claims, 16 Drawing Sheets

Related U.S. Application Data filed on May 18, 2022, provisional application No. 63/331,405, filed on Apr. 15, 2022.

(51) Int. Cl.
*H04L 9/32* (2006.01)
*H04L 67/104* (2022.01)

(58) Field of Classification Search
CPC .... G06F 21/645; G06F 16/1824; G06F 21/44; G06F 21/629; G06F 16/2379; G06F 16/9027; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; H04L 63/12; H04L 63/123; H04L 63/126; H04L 9/50; H04L 9/3236; H04L 67/104; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

| | | | | |
|---|---|---|---|---|
| 11,057,222 | B2 | 7/2021 | Qiu | |
| 11,196,566 | B2 | 12/2021 | Middleton | |
| 11,200,570 | B2 | 12/2021 | Lu | |
| 11,468,077 | B2 | 10/2022 | Destefanis | |
| 11,860,819 | B1 * | 1/2024 | Chud | G06F 16/137 |
| 2017/0132626 | A1 | 5/2017 | Kennedy | |
| 2018/0082390 | A1 | 3/2018 | Leidner | |
| 2018/0096163 | A1 | 4/2018 | Jacques De Kadt | |
| 2018/0285837 | A1 | 10/2018 | Wu | |
| 2019/0173854 | A1 | 6/2019 | Beck | |
| 2019/0296916 | A1 | 9/2019 | Qiu | |
| 2019/0334886 | A1 | 10/2019 | Lelcuk | |
| 2019/0379543 | A1 | 12/2019 | Sethi | |
| 2020/0045019 | A1 | 2/2020 | Huang | |
| 2020/0112427 | A1 | 4/2020 | Nakamura | |
| 2020/0127853 | A1 | 4/2020 | Qiu | |
| 2020/0228348 | A1 | 7/2020 | Qi | |
| 2020/0250719 | A1 | 8/2020 | Shah | |
| 2020/0313903 | A1 * | 10/2020 | Yu | H04L 9/3073 |
| 2020/0380505 | A1 | 12/2020 | Shah | |
| 2020/0380624 | A1 | 12/2020 | Turgman | |
| 2021/0044428 | A1 | 2/2021 | Hwang | |
| 2021/0081400 | A1 | 3/2021 | Park | |
| 2021/0082044 | A1 | 3/2021 | Sliwka | |
| 2021/0097528 | A1 | 4/2021 | Wang | |
| 2021/0110388 | A1 | 4/2021 | Gonzales, Jr. | |
| 2021/0256009 | A1 | 8/2021 | Qi | |
| 2022/0052857 | A1 | 2/2022 | Middleton | |
| 2022/0138748 | A1 | 5/2022 | Millar | |
| 2022/0300964 | A1 | 9/2022 | Chung | |
| 2022/0383296 | A1 | 12/2022 | Gottschalk | |
| 2023/0047830 | A1 | 2/2023 | Laurence | |

FOREIGN PATENT DOCUMENTS

| | | | |
|---|---|---|---|
| CN | 112950415 | B | 6/2021 |
| CN | 111191284 | B | 4/2022 |
| EP | 3419210 | A1 | 12/2018 |
| KR | 2021-0017432 | A | 2/2021 |
| TW | M593602 | U | 4/2020 |
| WO | 2019215437 | A1 | 11/2019 |
| WO | 2022192725 | A1 | 9/2022 |

OTHER PUBLICATIONS

Androulaki, Elli et al. "Hyperledger Fabric: A Distributed Operating System for Permissioned Blockchains" [online] ACM.org, Apr. 17, 2018 [retrieved Feb. 17, 2024]. Retrieved from the Internet: URL: https://dl.acm.org/doi/pdf/10.1145/3190508.3190538 (Year: 2018).

Baliga Arati et al: "Performance Characterization of Hyperledger Fabric", 2018 Crypto Valley Conference on Blockchain Technology (CVCBT), IEEE, Jun. 20, 2018 (Jun. 20, 2018), pp. 6S-74S, XP033441920, DOI: 10.1109/CVCBT.2018.00013.

Chinese Office Action, Chinese Patent Application No. 2022800313066, mailed Jul. 31, 2024.

Extended European Search Report, European Patent Application No. 22768128.5, mailed Jul. 5, 2024.

International Search Report and Written Opinion, PCT Application PCT/US2022/020033, mailed Jun. 14, 2022.

International Search Report and Written Opinion, PCT Application PCT/US2023/018635, mailed Sep. 5, 2023.

International Search Report and Written Opinion, PCT Application PCT/US2023/084489, mailed Apr. 22, 2024.

Office Action, U.S. Appl. No. 18/547,029, mailed Feb. 23, 2024.

Office Action, U.S. Appl. No. 18/547,029, mailed Jul. 29, 2024.

Shadowman et al. "How does a public key verify a signature?" [online] StackOverflow via Archive.org, May 26, 2020 [retrieved Feb. 17, 2024]. Retrieved from the Internet: URL: https://web.archive.org/web/20200526193946/https://stackoverflow.com/questions/18257185/how-does-a-public-key-verify-a-signature (Year: 2020).

Wang Shuai et al: "Blockchain-Enabled Smart Contracts: Architecture, Applications, and Future Trends", IEEE Transactions on Systems, Man, and Cybernetics: Systems, IEEE, Piscataway, NJ, USA, vol. 49, No. 11, Nov. 1, 2019 (Nov. 1, 2019), pp. 2266-2277, XP0117S06SO, ISSN: 2168-2216, DOI: 10.1109/TSMC.2019.289S123.

Extended European Search Report, European Patent Application No. 23789000.9, mailed Feb. 4, 2026.

Extended European Search Report, European Patent Application No. 23908232.4, mailed Jan. 26, 2026.

Ecaf "Draft Proposal for ECAF's Official Notification System" [online] Medium, 2018 [retrieved Mar. 3, 2026]. Retrieved from the Internet: URL: https://steemit.com/eos/@ecaf/draft-proposal-for-ecaf-s-official-notification-system (Year: 2018).

Grigg; Ian "The EOS Arbitration Process Explained by Ian Grigg" [online] YouTube/"E-Labz", Jun. 12, 2018 [retrieved Mar. 3, 2026]. Retrieved from the Internet: URL: https://www.youtube.com/watch?v=LbUCXnaBQc8 (Year: 2018).

Office Action, U.S. Appl. No. 18/769,140, mailed Mar. 11, 2026.

Rose; Kevin "ECAF Order#ECAF00000264" [online] Medium, Jul. 14, 2018 [retrieved Mar. 3, 2026]. Retrieved from the Internet: URL: https://medium.com/eos-new-york/ecaf-order-ecaf00000264-e90d87cfadb8 (Year: 2018).

* cited by examiner

Request Verification Processing for Transactions

SECURE RETRIEVAL OF OFF-NETWORK DATA BY TRUSTED NETWORK ENTITIES

This application is a U.S. National Phase of International Application No. PCT/US2023/018635, filed Apr. 14, 2023, which claims priority to U.S. Provisional Application No. 63/356,295, filed Jun. 28, 2022; U.S. Provisional Application No. 63/343,279, filed May 18, 2022 and U.S. Provisional Application No. 63/331,405, filed Apr. 15, 2022, all of which are incorporated by reference herein in their entirety.

BACKGROUND

A distributed, decentralized network is a network of entities, usually referred to as "nodes," each of which stores or records a current state of the entire network, among other possible information. The state of the entire network may be made up of individual states, each associated with an entity that "owns" the individual state. The owning entity of a state is usually referred to as the "owner." Among the characteristics and properties of a distributed, decentralized network is a principle that each node is bound by, or agrees to, a set of rules and/or protocols governing how and under what circumstances individual states may change. For example, proposed changes may need to be agreed upon by a majority of the nodes, and some form of proof or work or proof of stake may need to be carried out on any collection of one or more proposed state changes. Another rule may require that only the owner of a state can invoke or initiate a proposed change to that state.

SUMMARY

A blockchain network is an example of a distributed, decentralized network. Specifically, a blockchain network may include a sequence of data structures, or "blocks," each respective one of which records the entire history of the network states up through the time at which the respective block was added to the sequence. The sequence of blocks form a linked chain, and each block is encoded in such a way that it is practically, if not actually, impossible to modify once entered in the chain. New blocks can be added recording an updated state (temporal snapshot), but existing blocks cannot be changed. That is, the blockchain is backwardly immutable.

The backward immutability of blockchains, together with their distributed, decentralized nature of blockchains, can pose impediments to rectifying errant or otherwise defective network states recorded in blocks. The inventors have recognized that there is a need for a capability to remedy problematic network-state recordings in distributed, decentralized networks, but to be able to do so without tampering with the distributed, decentralized nature. Thus, the inventors have devised techniques, methods, and systems for achieving these desirable goals.

Accordingly, a first example embodiment may involve a method carried out by a computing system configured for operating as a node of a network of nodes operating a blockchain. The method may involve operations including: receiving a request message for placing an entry on the blockchain, wherein the request message comprises: (i) a request specification for the entry including an action and an identity of at least one party subject to the action, (ii) an indicator specifying that the entry has been authorized by a trusted entity, and (iii) a plurality of cryptographic verification codes generated by a corresponding plurality of trust verifiers, each cryptographic verification code comprising an encoded action-payload supplied by the trusted entity and cryptographically signed by a respective one of the trust verifiers; applying a public encryption key of each respective trust verifier to the corresponding cryptographic verification code to decrypt a corresponding encoded action-payload; making a first verification that at least a threshold number of the decrypted corresponding encoded action-payloads are identical; and submitting the entry for block processing to be added to the blockchain in response to making at least the first verification.

A second example embodiment may involve method carried out by a computing system configured for operating as a node of a network of nodes operating a blockchain. The method may involve operations including: receiving a request message for placing an entry on the blockchain configured for invoking a contingency action of a smart contract previously entered on the blockchain, wherein the request message comprises: (i) a request specification including a link to the smart contract, an identifier of the contingency action, and an identity of a designated action-caller authorized to invoke the contingency action, (ii) an indicator specifying that the entry has been authorized by a trusted entity, and (iii) a plurality of cryptographic verification codes generated by a corresponding plurality of trust verifiers, each cryptographic verification code comprising an encoded action-payload supplied by the trusted entity and cryptographically signed by a respective one of the trust verifiers; applying a public encryption key of each respective trust verifier to the corresponding cryptographic verification code to decrypt a corresponding encoded action-payload; making a first verification that at least a threshold number of the decrypted corresponding encoded action-payloads are identical; generating a transaction specification and placing it in the entry in response to making at least the first verification, wherein the generated transaction specification comprises a directive to execute the identified contingency action as authorized by the trusted entity acting an authenticated alias of the designated action-caller; and submitting the entry for block processing to be added to the blockchain.

A third example embodiment may involve a method carried out by a computing system configured for operating as database server for verifying and storing encoded action-triggers for digital assets entered on a blockchain network. The method may involve operations including: receiving a request message for verifying and storing a verified action-trigger for a digital transaction entered on the blockchain network, wherein the request message comprises a request specification including an action and an identity of at least one party associated with a digital asset subject to the action; receiving a plurality of cryptographic verification codes independently generated by a corresponding plurality of trust verifiers, each cryptographic verification code comprising a trigger code sourced from a trusted entity and cryptographically signed by a respective one of the trust verifiers; applying a public encryption key of each respective trust verifier to the corresponding cryptographic verification code to decrypt a corresponding trigger code; making a first verification that at least a threshold number of the decrypted corresponding trigger codes are identical; applying an encoder function to the request specification to derive a local version of the trigger code associated with the action; making a second verification that the local version of the trigger code is identical to that of each of the at least the threshold number of decrypted corresponding trigger codes that are identical; and storing the trigger code as the verified action-trigger in a database associated with the computing system.

A fourth example embodiment may involve method carried out by a computing system configured for operating as database server for verifying and storing encoded action-triggers for smart contracts entered on a blockchain network. The method may involve operations including: receiving a request message for verifying and storing a verified action-trigger for a smart contract entered on a blockchain network, wherein the request message comprises a request specification including a link to the smart contract and an identifier of the contingency action of the smart contract; receiving a plurality of cryptographic verification codes independently generated by a corresponding plurality of trust verifiers, each cryptographic verification code comprising a trigger code sourced from a trusted entity and cryptographically signed by a respective one of the trust verifiers; applying a public encryption key of each respective trust verifier to the corresponding cryptographic verification code to decrypt a corresponding trigger code; making a first verification that at least a threshold number of the decrypted corresponding trigger codes are identical; applying an encoder function to the request specification to derive a local version of the trigger code associated with the contingency action; making a second verification that the local version of the trigger code is identical to that of each of the at least the threshold number of decrypted corresponding trigger codes that are identical storing the trigger code as the verified action-trigger in a database associated with the computing system.

In a fifth example embodiment, a computing system may include at least one processor, as well as memory and program instructions. The program instructions may be stored in the memory, and upon execution by the at least one processor, cause the computing system to perform operations in accordance with any one or more of the first, second, third, and fourth example embodiments.

In a sixth example embodiment, an article of manufacture may include a non-transitory computer-readable medium, having stored thereon program instructions that, upon execution by a computing system, cause the computing system to perform operations in accordance with any one or more of the first, second, third, and fourth example embodiments.

In an seventh example embodiment, a system may include various means for carrying out each of the operations of any one or more of the first, second, third, and fourth example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
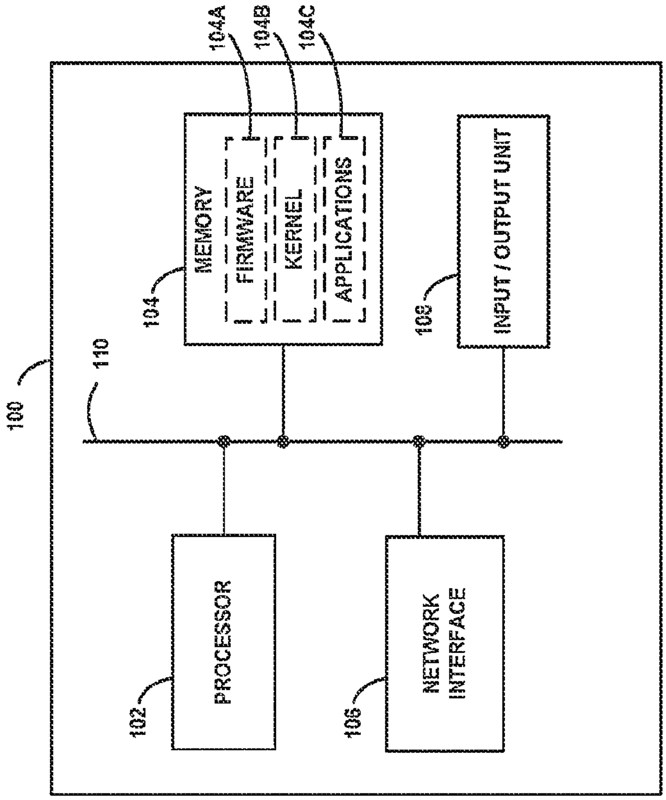
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

Blockchain-based technology underlies and facilitates a new form of decentralized computing that has been used to provide cryptocurrencies, smart contracts, non-fungible tokens (NFTs), identity protection, and secure voting, among many other applications. There is speculation, at least from some sources, that a new version of the world-wide web ("web 3.0") can be built atop one or more blockchains. Regardless, it appears indisputable that block-chain-based technology has had an impact on computer networks and other aspects of society even though it has only existed in a practical form for a little over a decade.

Herein, "blockchain-based" technology refers to any variation of blockchain technology or any technology that employs or relies upon blockchain mechanisms. This includes current and future variations of blockchain technology.

In short, a blockchain is a list of entries stored as a distributed database that can grow over time based on consensus protocols carried out by blockchain nodes. Groups of entries are added to the blockchain within data structures that take the form of blocks, and sequential blocks are cryptographically linked to one another. The blockchain nodes are computing devices or computing systems that can communicate with one another in a peer-to-peer fashion using blockchain software, and thus may reside in different locations and may be operated by different entities. Blockchain nodes may form an overlay on an existing computer network (e.g., the Internet), and may be jointly referred to as a blockchain network. To maintain independence and the decentralized character of the blockchain, each blockchain node may store its own copy of the entire blockchain.

Each block contains a cryptographic hash of the previous block in the blockchain, a timestamp, and data. The cryptographic hash may be produced by any one-way (hash) function that is mathematically and/or computationally impractical to reverse, such as SHA-256. The sequential linking of blocks through a cryptographic hash chain makes it very difficult for any party to modify a recently-placed block, and virtually impossible to modify earlier blocks.

Each blockchain user has a unique address to use with the blockchain. Each user also has a public key/private key pair that are cryptographically associated such that data encoded with the public key can be only be decoded by the corresponding private key, and vice versa. Thus, data encoded with a user's public key are effectively encrypted so that they can only be decrypted by the user's private key, and data encoded with the user's private key results in a digital signature that is verifiable with the user's public key.

An entry is typically some form of transaction between two or more users that includes the address of the "sending" user, the information being "sent," and the address of one or more "receiving" users, all of which is signed with the digital signature of the sending user. Thus, the entry can easily be verified to be from the sending user (the sending user is authenticated) and have integrity (the entry was not changed after signing) as well as non-repudiation (the sender cannot later deny having signed the entry). The information being sent may be some amount of cryptocurrency, a smart contract, or some other token.

Proposed new entries are received by one or more blockchain nodes and their digital signatures are authenticated. In some cases, the validity of the entry may also be verified (e.g., an entry on a cryptocurrency blockchain cannot cause an amount of cryptocurrency held by the sender to be less than zero). These entries are formed into blocks, and then these blocks are distributed across the blockchain network to the other blockchain nodes. Each block may include one or more entries.

Each blockchain node independently authorizes received blocks through an agreed-upon consensus protocol. An example of such a protocol is "proof of work," where the blockchain nodes attempt to solve a mathematical puzzle by trial and error. For instance, the consensus protocol may require that the blockchain nodes attempt to find a nonce (e.g., an unknown value) such that a cryptographic hash function performed over the block with the nonce appended results in a hash value with a specified number of leading zeros. The process of carrying out this protocol is often referred to as "mining" and requires a significant amount of computational power.

The first blockchain node that discovers a suitable nonce broadcasts this nonce and the resulting hash value to the rest of the blockchain network. It is trivial for the other blockchain nodes to validate whether the nonce and hash value are correct. Such a block is said to have been "mined" and the discoverer may be awarded accordingly (e.g., with a small amount of cryptocurrency) to motivate participation in the protocol. Once a simple majority of the blockchain nodes agree that the block has been mined, the block is added to the blockchain by all blockchain nodes. Note that not all blockchain nodes need to act as miners in this fashion.

The cryptographic linking of blocks and proof of work being used for consensus, makes illegitimate modifications of a blockchain to be practically infeasible, as an attacker must modify all subsequent blocks in order for the modifications of one block to be accepted. Thus, blocks on a blockchain are effectively backwardly-immutable. Nonetheless, other consensus protocols, such as those based on proof of stake, may be used instead.

From time to time, a blockchain may undergo a fork and effectively change its character or become two different blockchains. Notably, the integrity of a blockchain relies on the blockchain nodes thereof agreeing on the rules used to add blocks and maintain history. If these nodes do not or cannot agree on the rules, or collectively agree to adopt a new set of rules, a fork is said to have occurred.

Some forks are accidental and short-lived. For instance, two miners may complete successful mining of a block at about the same time. After these miners begin broadcasting their solutions to the block, different blockchain nodes may add one or the other of these blocks to their local copies of the blockchain. Eventually, the addition of subsequent blocks will cause one of these versions of the blockchain to become longer than the other, and the blockchain nodes will abandon (orphan) the shorter version.

On the other hand, an intentional fork can happen when the rules are changed for at least some of the blockchain nodes. A soft fork occurs when the rules are changed in a backward-compatible fashion for a majority of the blockchain nodes (e.g., to add new types of entries). Thus, a single blockchain remains, with the blockchain nodes for which the rules have not been updated still recognizing new blocks as valid. Eventually, all blockchain nodes may be updated to the new rules.

A hard fork occurs when a majority of the blockchain nodes adopt new rules that render blocks produced by the new rules to be considered invalid under the old rules. Unless all blockchain nodes upgrade to the new rules, a permanent split can occur with a single blockchain diverging to become two independent blockchains-one operating in accordance with the new rules and the other operating in accordance with the old rules.

One of the major uses of blockchain technology, in addition to supporting cryptocurrencies, is the formation and execution of smart contracts. Smart contracts are executable logic (e.g., programs or code snippets) that are placed in entries. A smart contract's logic is run when certain predetermined conditions are met. A simple smart contract may consist of "if-X-then-Y" logic, where X is a set of one or more conditions and Y is a set of one or more operations to be carried out when X becomes true.

As an example, smart contract logic may specify that when a shipment arrives at a recipient's location (X), the recipient pays the sender an amount of money (Y). The smart contract may also specify one or more external data sources (e.g., output from sensors or application programming interfaces of other computing systems) that will be used to determine whether and when X becomes true. These sources are referred to as "oracles" and are trusted by all parties to the smart contract. For instance, an oracle for the above-mentioned shipment might be a wireless location sensor attached to the shipment that provides global positioning system (GPS) data, or a representational state transfer (REST) interface of a computing device that is tracking the shipment's location.

Since entries on a blockchain containing smart contracts cannot be modified, execution of a smart contract may place further entries on the blockchain to carry out the operations of Y. Alternatively, off-block software tools may be used to check the status of a smart contract and then add entries as necessary for Y. In some cases, these further entries may also be smart contracts with different sets of conditionally-executable logic. Thus, smart contracts can be chained to perform a complex series of operations.

Given all of this, current blockchains have a set of generally desirable properties. They are decentralized and thus do not rely upon a single governmental or societal authority for their operation. A blockchain is a typically a public document that can be stored, viewed, and analyzed by anyone. Anyone can become a miner, but a majority control over all mining entities is required to corrupt the blockchain. Any user can create a blockchain "account" by creating a unique address for themselves, and thus interact with other users by way of the blockchain without needing preapproval. Invalid transactions are automatically discarded by blockchain nodes. As noted, blocks are effectively backwardly-immutable (existing blocks cannot be changed) once they are placed on the blockchain, and become even harder to change over time as subsequent blocks are added.

Nonetheless, current blockchain technology also suffers from a number of limitations. First, there is no built-in recourse for theft, fraud, money laundering, or deceptive practices. As a result, blockchains have become host to these and other types of illegal activities, and evidence suggests that criminals are actively attracted to blockchains due to their lack of a central authority. Further, copyrighted or confidential information placed on a blockchain is effectively impossible to remove therefrom. Moreover, there is no way to recover a lost, misplaced, or stolen private key, and the owner of such a private key will not be able to access their blockchain account. These factors ultimately create enough risk for the average user that blockchain-based technology may fail to have utility beyond a few niche areas.

For example, compare the situation that confronts a blockchain user who mistakenly sends cryptocurrency to the wrong address (or who is lured by a fraudster to submit such a transaction, or whose private key is stolen by a hacker) versus the same user sending fiat currency through traditional banking channels. For the former, current blockchains afford no mechanism by which the cryptocurrency can be restored to its rightful owner even though the recipient has no legal entitlement to the funds and may very well have broken the law to obtain them. In contrast, the latter enjoys a host of protections, all of which are made possible by the fact that the transaction takes place through a chain of intermediary banks or other entities that are locatable and subject to court enforcement if they breach warranties or fail to alter the transactions to conform to the background law.

The example embodiments herein overcome these fundamental drawbacks to blockchain technology without changing the core tenets of its immutable and decentralized nature. In particular, a third party agreed upon ahead of time by blockchain users, or possibly designated by law or regulation, may be permitted to modify certain blockchain transactions after the fact. These modifications are not to existing blocks, but instead allow the third party to add new blocks to a blockchain that enforce and/or compel pre-established agreements, regulations, or judicial decisions, for example. Thus, the effects and/or outcomes of transactions or agreements represented in older blocks can be modified (e.g., corrected, rectified, or reversed) with the addition of newer blocks even if the older blocks themselves are immutable. At the same time, in accordance with example embodiments, procedures by which the third party may compel an action on the blockchain ensure that the third party's authority to do so cannot be misused or corrupted. The procedures also operate according to the distributed, decentralized nature of the blockchain, and thereby do not compromise or forfeit the desirable aspects of blockchain-based technology.

A first possible embodiment is referred to herein as a "system-level" implementation because it involves changes to the blockchain itself—the data stored in entries and/or the rules carried out by blockchain nodes. This may involve deployment of a new blockchain or a soft or hard fork of an existing blockchain. All users that participate in this blockchain may explicitly (or implicitly through their use of the blockchain) agree that their entries are governed by a set of controls and enforcement of these controls that resides in one or more third parties (e.g., an arbitrator, court, other governmental body, or just another person or entity that is generally trusted). By way of example, the third party could be a judicial court.

By way of example, if there is a dispute between one or more users with respect to an entry in which they are involved, any of these users may request a ruling from such a third party. The third party may consider the request in light of the set of controls and/or applicable legal principles. If the third party decides that the entry needs to be modified, it records a representation of such a modification. This representation may be a new entry submitted directly to the blockchain, or a code, token, or other document published in a particular location (e.g., on a web site or a REST interface). The representation may identify the disputed entry, the users involved, the particular location (e.g., in the form of a uniform resource locator (URL)), and a transaction that the third party has determined to be appropriate to rectify or mitigate any harm done to one or more of the users. This representation may be digitally signed by the third party to establish its legitimacy, although a digital signature need not necessarily be required in all implementations and/or usage scenarios.

If the representation is not provided directly to the blockchain, an intermediary, off-chain entity controlling one or more server devices may obtain representations from the third party and submit them to the blockchain on behalf of the third party. For example, the intermediary entity may subscribe to notifications of new representations from the third party and/or periodically poll the third party (e.g., scrape its web site or REST interface).

Once submitted to blockchain nodes, these nodes may authorize the block and conduct the consensus protocol as described above. Additional authorization steps may be to verify the third party's digital signature, verify that the representation actually exists at the particular location, and/or that the identified third party indeed has authority to modify entries on this blockchain. The blockchain nodes mine the entry's block in the usual fashion and the block gets added to the blockchain if a majority of the nodes agree that the block is valid and the mining was successful.

As an example, suppose that an entry on the blockchain involves user A transferring C units of cryptocurrency to user B. User A later finds out that their blockchain account was hacked to make this transaction. User A may contact the third party (e.g., a court), and supply evidence of the hacking (e.g., server logs, witness testimony, expert testimony, etc.). The third party may then rule in favor of user A and publish a representation of its ruling at a particular URL of its web site.

The representation may indicate that user B is to be compelled to transfer C units of cryptocurrency to user A on the blockchain (or some amount higher than C if user B was the perpetrator and punitive damages are included). The representation may include the URL, an effective date, and the identity of the third party, and may, if, for example necessary, be digitally signed by the third party. The effective date could be when a block containing the representation is mined, or at some point in the future (e.g., to give user B an opportunity to appeal or dispute the ruling). Alternatively, the effective date could be specified in the blockchain protocols and follow automatically. In some cases, the representation may temporarily freeze or seize the assets of user B on the blockchain so that user B cannot liquidate those assets prior to being compelled to make user A whole.

Once published, the intermediary entity may obtain the representation, form it into an entry, and submit it to the blockchain. During the mining process, the blockchain nodes may independently determine that the third party has the authority to compel this action (e.g., this capability of the third party may be built into the blockchain operation), and may also verify that the information stored at the URL matches the representation. As noted, once a majority of blockchain nodes agree that the block is valid and the mining was successful, the block can be added to the blockchain.

Advantageously, this mechanism does not require that the blockchain nodes, blockchain users, or third party trust the intermediary entity. Further, the blockchain might grant only certain powers to the third party with respect to the types of disputes that it can resolve, the remedies used, and the users over which it has authority. Moreover, the use of the consensus protocol guarantees that attempts to subvert or use the third party authority in an illegitimate fashion requires control over a majority of the blockchain nodes. As discussed above, the mining process makes doing so computationally infeasible for most actors.

While the above example illustrates the case of a transaction, the system-level implementation also provides operations for cases of smart contracts as well. More particularly, in a scenario involving a smart contract, such as a dispute regarding fulfillment of a obligated action stipulated in the smart contract, the system-level implementation provides procedures for a trusted third party, such as a judicial court, act as an "authorized alias" for invoking the obligated action. As with the transaction case, the procedures ensure that any instance in which this new capability is exercised is secure and safe from hacking, corruptions, or any other form of misuse.

A second possible embodiment is referred to as an "entry-level" implementation because it involves coding pre-determined contingency actions into individual blockchain entries on an entry-by-entry basis, and subject to prior approval of only the parties participating in the agreement or transaction recorded in each such respective entry. The entry-level implementation may also be referred to as a "smart-contract" implementation because it may include smart-contract-like features of embedding coded actions in individual blockchain entries, but fortifies the confidence that the coded actions in any given entry will be carried out pursuant to the agreement by vesting authority to enforce the coded actions with a third party trusted by the parties to the agreement in the given entry. Unlike the first embodiment, the entry-level implementation may be able to be deployed using existing blockchains with smart contract support. Nonetheless, this embodiment could be carried out by way of a new blockchain or a fork of an existing blockchain.

Here, the entire blockchain need not necessarily be subject to the authority of any third party. Instead, pairs or groups of users may determine multilaterally to be bound by smart contracts that provide two new mechanisms: (i) a list of one or more remedial (or contingent) actions that are to be taken if certain conditions become true, and (ii) a third party who the users have agreed will have authority over the smart contract. Thus, the third party control may be granted on an entry-by-entry basis of the blockchain and not all blockchain entries are subject to such control. The remedial actions could be any type of state change that can be represented on the blockchain.

A smart contract may specify one or more conditions and associated remedial actions using the aforementioned "if-X-then-Y" logic. Each condition may be associated with a code, which could be a unique string of binary digits, a QR code, or take some other form. For example, user A and user B may engage in a smart contract in which user A will provide user B with 10 widgets and user B will provide user A with $500 (reflected in a digital asset) in return. These users may agree that the smart contract is further governed by two conditions, each with a remedial action: (i) if the widgets are not all delivered to user B by a particular time and date, then user A will refund $100 to user B, and (ii) if the widgets are not of workmanship quality as understood in the industry, then user A will refund all $500 to user B. Similarly, the amount of the payout to A may be left as a variable assignable by the third party. In some cases, the users may include a provision in the smart contract such that any other unspecified condition giving rise to a dispute is to be remediated by the third party.

This smart contract is submitted to the blockchain, then validated and mined as described above. Suppose that user B contends that the first remedial action has been triggered, and that the users are unable to resolve the dispute on their own. User B may then involve the pre-established third party, and provide evidence of late delivery to the third party (e.g., a bill of lading indicating that the widgets were delivered a week late). The third party may rule in favor of user B and publish a representation of its ruling at a particular URL of its web site.

The representation may include the smart contract, the URL, an effective date, the identity of the third party, and the code identifying the condition, and may be digitally signed by the third party. Once published, the intermediary entity may submit an entry to the blockchain for mining as described for the first embodiment. Here, the blockchain nodes may further validate that the code matches one from the smart contract. Once placed on the blockchain this entry serves to "modify" the smart contract-particularly, the presence of the code in an entry signed by the third party causes the remedial condition in the smart contract to be invoked, transferring $100 from user A to user B.

This mechanism also does not require that the blockchain nodes, blockchain users, or third parties trust the intermediary entity. Additionally, each of set of users involved in a smart contract can independently select their own third party, further decentralizing authority over different smart contracts. Moreover, the third party's ruling is unambiguous and not open to interpretation since it invokes logic already present in the smart contract.

The description of the entry-level implementation in terms of smart-contract-like operations should not be confused with the smart contract scenario of the system-level implementation. More particularly, each of the system-level implementation and the entry-level implementation provide operations and functionality for both transactions scenarios and smart contract scenarios.

A third possible embodiment is a hybrid of the first and second embodiments. Like the first embodiment, the blockchain is structured initially or forked so that all entries are governed by a set of controls and enforcement of these controls lies in one or more third parties. However, the controls also apply to smart contracts on the blockchain even if these smart contracts do not have the pre-established conditions and associated remedial actions of the second embodiment. Nonetheless, like the second embodiment, the third parties can "modify" smart contracts by adding new entries that trigger transactions or contain smart contracts themselves. Otherwise, operation takes place in a similar fashion to that of the second embodiment.

This embodiment avoids the users involved in each smart contract having to identify a third party that they mutually trust to enforce provisions of the contract—the third parties are determined by the blockchain. While this makes entry into smart contracts simpler, it also requires that the users rely on the blockchain's established third parties. Similarly, this embodiment allows non-parties to the smart contract (such as a government agency or an aggrieved non-party) to "modify" smart contract execution where the designated third party approves.

In any of these embodiments, the entry that enforces the third party's ruling may be placed on a different blockchain from the previous entry that it "modifies." Thus, the same blockchain need not be used for both types of entry, or a transaction on one blockchain can be used to remedy disputes that arise in connection with transactions on another blockchain.

Notably, all three embodiments facilitate an operation that is not currently supported by blockchain-based technology-a third party adding an entry that compels a transaction from a sending user to a receiving user, or that compels a smart contract operation, without requiring that this transaction is digitally signed by the sending user or by the receiving user or of the owner of the smart contract (e.g., in the case of a smart contract or the like). Instead, so long as the entry from the third party can be validated as having been legitimately sourced by, and/or originated from, the third party, it is added to the blockchain. Advantageously, such functionality may elevate and advance blockchain-based technologies to become reliable enough for general use, while retaining all of their desirable decentralized and distributed features.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support a blockchain and/or blockchain-related architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
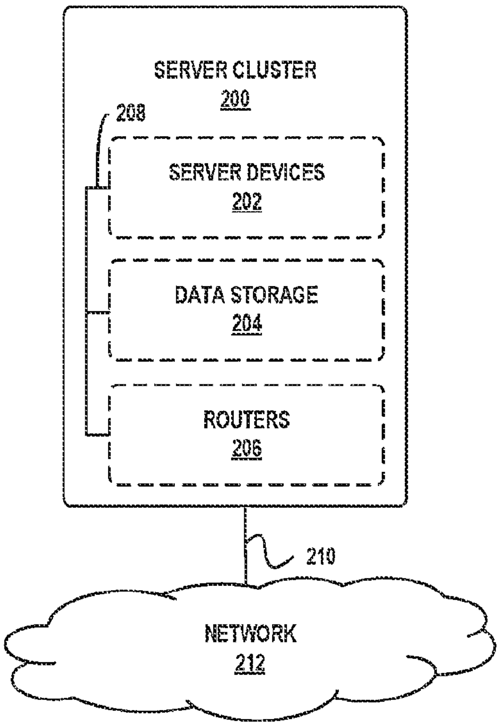
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE SYSTEM-LEVEL BLOCKCHAIN EMBODIMENT

In accordance with example system-level embodiments, a designated, trusted off-chain authority may cause an entry to be made in a blockchain that compels a blockchain-recorded action between two or more parties to a previously-recorded entry on the blockchain. Conventionally, a blockchain entry that specifies an action or arrangement (such as an agreement or contract) between two or more parties requires some cryptographically-verifiable form of the users' identities, such as a digital signature, to verify the action and validate the new entry. In contrast, the designated, trusted off-chain authority of the system-level implementation is a third party, and not one of the parties to the previous entry. Example system-level embodiments put in place a set of procedures and protocols that safeguard the integrity and validity of any directive to compel a blockchain-recorded action, while at the same time leaving in place and undisturbed the distributed and decentralized operating principles of the blockchain.

By way of example, a blockchain-recorded action may be a transaction that specifies a transfer of digital assets from a sending party, or sender, to a receiving party, or receiver. In order for the transaction to be considered valid, and thereby recorded as an entry in a block of the blockchain, a cryptographic key of the sender, or other form proof of ownership of the digital asset, must be involved in the transaction, such that any blockchain node can verify the sender's right to the digital asset, and thus the sender's right to transfer the digital asset. In an example use case of the system-level embodiment, the designated, trusted off-chain authority may be asked to reverse the effect of the transaction by causing a remedial action of a transfer of the digital assets back from the receiver to the sender to be entered into the blockchain.

Also by way of example, a blockchain-recorded arrangement (such as an agreement or contract) between two or more parties may be a smart contract that embeds one or more contingency action to be carried out if and when the any one or more of the contingency actions is or are invoke, or "called," by a "designated caller" who is authorized in the smart contract to make the call (i.e., to invoke the contingency action(s)). The smart contact, which is recorded in as an entry in the blockchain, typically includes executable code of each contingency action, as well as the identity of the designated caller (or callers) authorized to call the contingency action(s) and cause the associated code to run. In order for a call to be considered valid, and thereby cause the contingency action to be executed, a request or order to make the call can be made in a submission to the blockchain. The request includes a link to the smart contract in question, an identification of the contingency action being requested, any parameters that the contingency action may take or require, and a cryptographic key of the caller (or some other form of authentication) that demonstrates the requestor's authority to make the call. In an example use case of the system-level embodiment, blockchain operation may be configured to recognize the trusted off-chain authority as an "authorized alias" of the designated caller of a contingency action for the purpose of making a call, and thereby cause a contingency action of a smart contract to execute when asked or ordered to do so by the trusted off-chain authority.

Assuming the designated, trusted off-chain authority grants the request for an action or an aliased call, a specification of the action or call, authenticated by the trusted off-chain authority, may be electronically published or posted as a "trusted order" to a secure website or other server, and made available to a plurality of independent, trust verifiers. Each of the trust verifiers may then separately and independently retrieve the trusted order, and cryptographically sign it with a respective private cryptographic key, and separately and independently store their respective signed trusted order to a secure database. The plurality of signed trusted orders may then be retrieved from the secure database and provided, together with the specification of the remedial action, to the blockchain. For purposes of discussion, and by way of example, a trusted order may be created or generated as a hash of information that specifies the request embodied in the order. Similarly, the trust verifier function may be incorporated into the node protocols and thus allocated to all or a plurality of the nodes. Likewise, the secure database of signed trust orders can be housed on the blockchain or stored at another location.

Each of one or more nodes of the blockchain may then authenticate and decrypt the plurality of signed hashes using respective public keys of the trust verifiers, and verify that all of decrypted hashes are identical. This provides proof of validity of the hash. Each of the one or more nodes may then generate its own local version of the hash using the specification of the remedial action or of the requested aliased call. Upon verifying that the local version of the hash is identical to the retrieved, validated hash, each of the one or more nodes may thus be certain of the integrity and authenticity of the remedial action or aliased call, and proceed to encode it in a valid blockchain action according to usual blockchain procedures. Likewise, when the verification function is incorporated into the node protocols, a node may directly sign the remedial transaction on chain in lieu of signing and storing the trust order. Entry in a blockchain then causes the remedial action or aliased call to be effectively carried out and recorded in the blockchain.

An example implementation of a system-level embodiment, referred to as a system-level implementation, is describe in more detail below.

A. Example System Architecture and Technical Description

Figure 3:
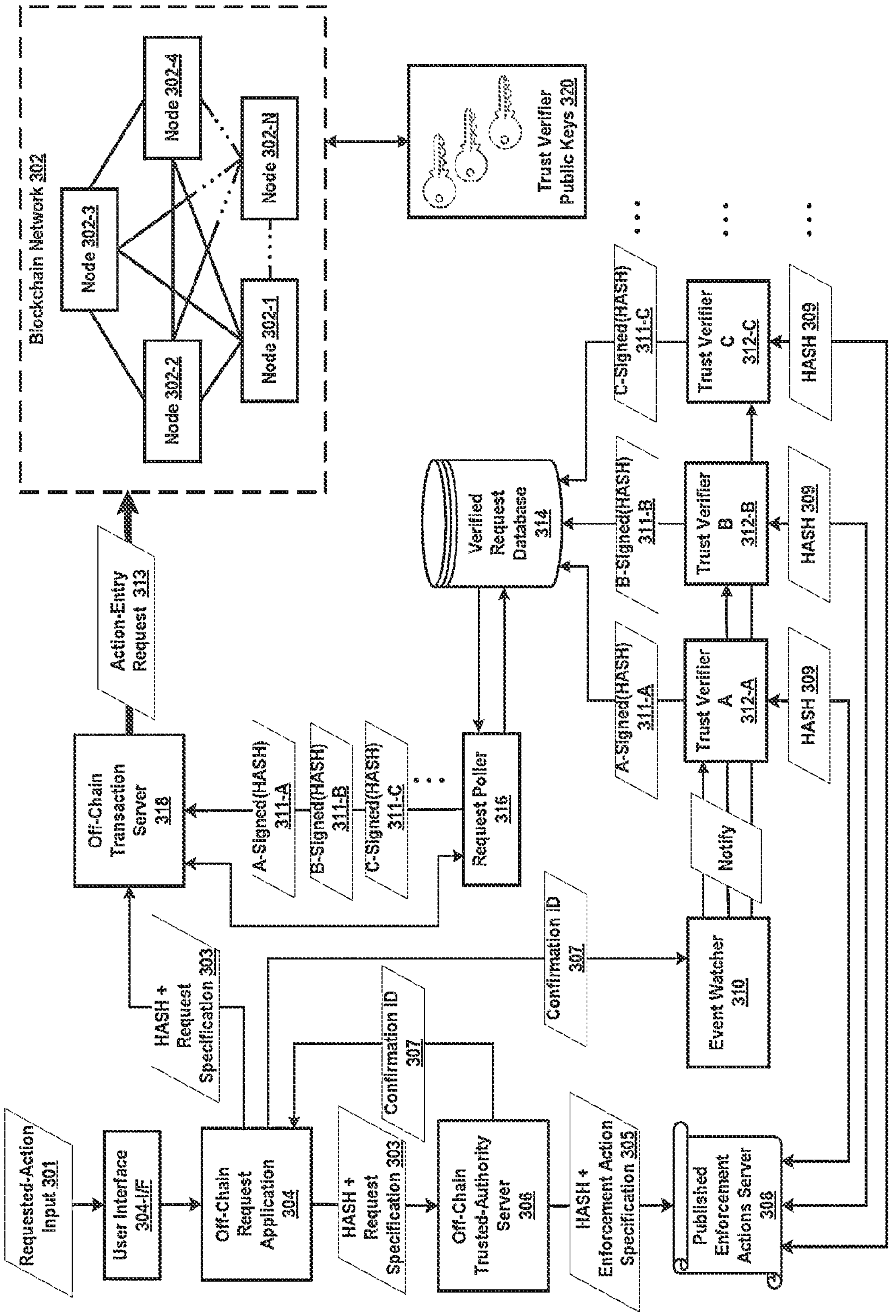
FIG. 3 illustrates a simplified block diagram of an example system in which various operations of a system-level implementation may be carried out, in accordance with example embodiments.

FIG. 3 is a simplified block diagram showing an example arrangement of components of a system-level implementation of authenticated off-chain modification of blockchain-based transactions, in accordance with example embodiments. The block diagram of FIG. 3 may also be considered as depicting aspects of an operational architecture of the system-level implementation. As shown, example embodiments can include various components, any one or more of which may be implemented as or in one or more computing devices. As such, components depicted in FIG. 3 may themselves be or include hardware, software, firmware, or combinations thereof. Some of the components may be identified structurally, such as databases or other forms of data storage and management, and others may be identified in terms of their operation or function. Operational and/or functional components could be implemented as software and/or hardware modules, for example, and may also be referred to as "modules" for the purpose of the present discussion.

The example system-level implementation can also include one or more connection mechanisms that connect various components. By way of example, the connection mechanisms are depicted as arrows between components. The direction of an arrow may indicate a direction of information flow, though this interpretation should not be viewed as limiting. In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switch, or other network device. Likewise, in this disclosure, communication (e.g., a transmission or receipt of data) can be a direct or indirect communication.

By way of example, various components and entities of the example system-level implementation of FIG. 3 includes a blockchain network 302 having connected nodes 302-1, 302-2, . . . , 302-N, where ellipses in the connections to node 302-N indicate possibly additional connected nodes. Other example components and entities of the example system-level implementation include an off-chain request application 304 with a user interface (UI) 304-I/F, an off-chain trusted-authority server 306, a published enforcement actions server 308, an event watcher 310, trust verifier A 312-A, trust verifier B 312-B, trust verifier C 312-C, verified request database 314, request poller 316, off-chain transaction server 318, and trust verifier public keys 320. The ellipses following the trust verifier C 312-C indicates that there could be addition trust verifiers. In an example embodiment, the off-chain request application 304 could be an application program configured for execution on a computing device, such as a PC, laptop, smartphone, or server, among other possible devices.

The computational and/or functional roles of the example components and entities may be understood by considering example operational scenarios involving transactions on the blockchain and smart contracts on the blockchain. Both types of scenarios involve similar, and in some respects the same, operations. However, in order to help keep the distinguishing aspects of the two scenarios clear, operational examples of the two scenarios are described separately below.

1. Example System-Level Scenario for Transactions on the Blockchain

In an example transaction scenario, the parties to a prior transaction may each be blockchain users, and the designated, trusted off-chain authority may be a judicial court represented by individual judges. A sender of prior transaction may claim to have been defrauded by a receiver of the transaction, and request a remedial action of a reverse transfer. The request for may be submitted by the sender or a legal representative of the sender (e.g., a lawyer), and may include specific information and evidence that enables a judge to render a decision to grant the request. Other transaction scenarios are possible as well.

More specifically to the example transaction scenario, a sender of a digital asset, such as digital currency, to a receiver may seek to reverse a transaction that transferred the digital asset from the sender's account to the receiver's account. For example, the sender may have been tricked or defrauded by the receiver, and thus may look to a judicial court for remediation. The sender or a legal representative of the sender (e.g., a lawyer) may enter a requested-action input 301 at the UI 304-I/F. The requested-action input 301 may include information identifying the sender, the receiver, details about the original transfer from the sender to the receiver, the remedial action being requested, and particular information that provides and/or serves as evidence that the sender was tricked or defrauded into entering in the original transaction. In accordance with example embodiments, the UI 304-I/F may be or include an online form with drop-down menus or the like, for example, that prompt the sender (or other more generally a user) for specific information required to construct a formal request and provide the court with requisite information for evaluating and granting or denying the request. It should be understood that the specific contents of the request-action input 301 listed above is just one example for purposes of the present illustration, and could include more, less, and/or different information in other usage scenarios and/or implementations.

The UI 304-I/F may provide the requested-action input 301 to the off-chain request application 304, which may then process the request for delivery to the judicial court, as well as (possibly conditionally) to the off-chain transaction server 318. Thus, in accordance with example embodiments, the off-chain request application 304 may arrange and/or format all or certain specific items or elements of the requested-action input 301 in a prescribed manner into a construct referred to for convenience herein as a "request specification," and may then generate a one-way hash of the request specification. For purposes of clarity in the discussion, the one-way hash of the request specification is labeled in all capital letters as the "HASH" to identify it with a specific instance of a hash function, and to distinguish it from other general references to hashes, hash functions, and the like. By way of example the HASH could be encoded as text string or string of characters, such as the following:

0xc8c48f65db62af1cea5e804e99f0139d5173cb0f.

Also for purposes of discussion, the HASH and request specification may be considered together as a data entity referred to as HASH plus request specification 303. It should be understood that this grouping is for convenience in the operational description and need not necessarily be implemented in practice (although the grouping is not necessarily excluded either). It should also be understood that other forms of encoding and/or representation of the request specification. Some non-limiting examples of alternatives are discussed below.

The HASH plus request specification 303 may then be provided to the off-chain trusted-authority server 306. In an example in which the trusted authority is a judicial court, the off-chain trusted-authority server 306 could be a server associated with the court and configured for receiving requests for compelling actions to be entered in a blockchain. For example, the off-chain trusted-authority server 306 may implement an API configured for receiving appropriately-formatted HASH plus request specification 303 messages or direct input. In other examples, the off-chain trusted-authority server 306 could be a more general server associated with the court and configured for receiving a variety of court/case-related input such as filing pleadings, or it could be a separate server for communicating to a judge. Other arrangements are possible as well. In some examples, the HASH plus request specification 303 may be provided "manually" to a judicial court, optionally together with supporting evidence for the request, by a legal representative of the sender, for example.

After the HASH plus request specification 303 is received by the off-chain trusted-authority server 306, an evaluation may be made as to whether or not to grant the requested action. Again, considering the example in which the trusted authority is a judicial court, the evaluation may be made by a judge or other authorized representative of the court. This may entail the judge evaluating information and evidence, and then rendering a decision. In other examples, evaluation of the information provided in the HASH plus request specification 303 might be able to be carried out autonomously by a computer-based algorithm. How a decision is made, and whether or not it is favorable to the sender (requestor of the action), is not within the scope of example embodiments. However, the further processing of, and procedures relating to, an outcome that is a favorable decision are within the scope of example embodiments.

Assuming a decision (e.g., by a person or by an algorithm) is made to grant the request, a HASH plus enforcement specification 305 may be posted or published to the published enforcement actions server 308. In the judicial example, the HASH plus enforcement specification 305 may be a human-readable electronic file that articulates the decision and includes an embedded alpha-numeric representation of the HASH. For example, the HASH plus enforcement specification 305 could be a PDF file digitally signed by the court or uploaded by a court employee with authority to do so. The published enforcement actions server 308 could be a publically-accessible server to which such decisions, among other forms of court business, are posted. In the example of a judicial court, the published enforcement actions server 308 could be a server such as the Public Access to Court Electronic Records (PACER) server and the digital signature could be a clerk's password for accessing PACER, for example. However, other arrangements are possible as well.

Also with a decision to grant the request, the off-chain trusted-authority server 306 may provide or send (e.g., transmit) a confirmation ID 307 to the off-chain request application 304, which may serve to inform the off-chain request application 304 of the decision, and provide it with identifying information for accessing the now-published HASH plus enforcement specification 305 at the published enforcement actions server 308.

In accordance with example embodiments, after the off-chain request application 304 receives the confirmation ID 307, it may in turn send the confirmation ID 307 to the event watcher 310. Doing so may alert the event watcher 310 to the availability of the HASH plus enforcement specification 305 at the published enforcement actions server 308. The off-chain request application 304 may then also provide or send (e.g., transmit) the HASH plus request specification 303 to the off-chain transaction server 318 to make it, too, aware of the availability of the HASH plus enforcement specification 305 at the published enforcement actions server 308 and to initiate creation of a formal request for a requested action to be entered into the blockchain 302. Similarly, a party or an attorney, having received notice of the decision, could prompt the event watcher, or could enter a message on the blockchain with the confirmation ID which transactions are monitored by the event watcher or by the trust verifiers directly.

The event watcher 310, having been alerted with the confirmation ID, may then independently notify each of the trust verifiers A, B, and C, 312-A, 312-B, and 312-C, as well as any additional trust verifiers, as indicated in FIG. 3. Each trust verifier could be a secure server or other networked secure computing system associated with a respective organization or institution, such as an established bank, brokerage, or network service provider, for example. Although not necessarily shown in the figure, the notification to each of the trust verifiers may also include the confirmation ID or other information enabling access to the HASH plus enforcement specification 305 at the published enforcement actions server 308.

Having been notified, each of the trust verifiers A, B, and C, 312-A, 312-B, and 312-C, as well as any additional trust verifiers (which could, in some examples, be one more of the nodes of the blockchain network), may then independently retrieve the HASH from the published enforcement actions server 308 over respective secure links. Each independent retrieval is shown with a label HASH 309 for purposes of the present discussion; again, the ellipses indicate additional retrievals of HASH 309 from additional trust verifiers. The trusted nature of the trust verifiers, together with secure retrieval allows each trust verifier to independently vouch for the authenticity of the retrieved HASH 309. Each trust verifier may do this by encrypting its retrieved HASH 309 with a private cryptographic key that serves as well as an authenticating digital signature. Thus, the trust verifier A 312-A generates the A-Signed (HASH) 311-A; the trust verifier B 312-B generates the B-Signed (HASH) 311-B; and the trust verifier C 312-C generates the C-Signed (HASH) 311-C. Each trust verifier may then store or deposit its respectively signed HASH in the verified request database 314. Additional signed HASHes may be generated and stored in the verified request database 314, as indicated (once more) by the ellipses. Similarly, a node itself may serve as a trust verifier and may be randomly selected to verify a given transaction (for example, the node that mined the last block or a random function based on data contained in the last block).

In further accordance with example embodiments, the off-chain transaction server 318 having received the HASH plus request specification 303, may communicate with the request poller 316 to monitor the verified request database 314 for the presence and/or availability of the signed HASHes from the trust verifiers. This may be done by polling the verified request database 314, or by some other arrangement or protocol. In some examples, the verified request database 314 could itself be a blockchain to which the HASHes are entered in blocks or housed on a blockchain or smart contract, and which may be monitored by the request poller 316 or a similar functional element. Likewise, the request could take the form of a message sent to the blockchain and the poller could be a node that monitors the messages in the blockchain's message pool. Similarly, the verifiers could directly co-sign the message with their private keys.

Upon determining that the HASHes have been added to the verified request database 314 and are available, the request poller 316 may retrieve the A-Signed (HASH) 311-A, the B-Signed (HASH) 311-B, and the C-Signed (HASH) 311-C (as well any additional signed HASHes), and provide them to the off-chain transaction server 318, and indicated in FIG. 3.

The off-chain transaction server 318 may then generate an action-entry request 313 and send it to the blockchain network 302. In practice, the action-entry request 313 may be delivered or sent to one of the nodes, and from there propagate to some or all of the other nodes. As described below, the action-entry request 313 may include the request specification and all retrieved cryptographically-signed HASHes, in addition to other information pertinent to the action being requested. In particular, each node of the blockchain network 302 that ultimately receives the action-entry request 313 may independently verify each signed HASH using publically-available trust verifier public keys 320 to decrypt each signed HASH. Each such node may then validate each HASH by ensuring that they are all identical. Any discrepant HASH value may indicate a breach or hack somewhere in the sequence so far described, and thereby cause further processing of the request to abort.

Each receiving node may further generate its own local version of the HASH by applying a one-way hash function to the request specification in the received action-entry request 313. By checking that its local version of the HASH is identical to the HASH from each of the verifiers, each node may now confirm that the requested action is not only authentic and authorized, but also comports exactly with the action requested and granted by the designated off-chain trusted authority. Each receiving node may then process the request and submit the requested action for entry into the blockchain just as it would for any requested action or transaction submitted by blockchain users. In this way, the request action may be effectively carried out and recorded in the blockchain. Notably, each of the trust verifiers need not be individually trusted, as at least a majority of the trust verifiers agreeing on the value of HASH provides a collective level of trust across all of the trust verifiers.

Figure 4A:
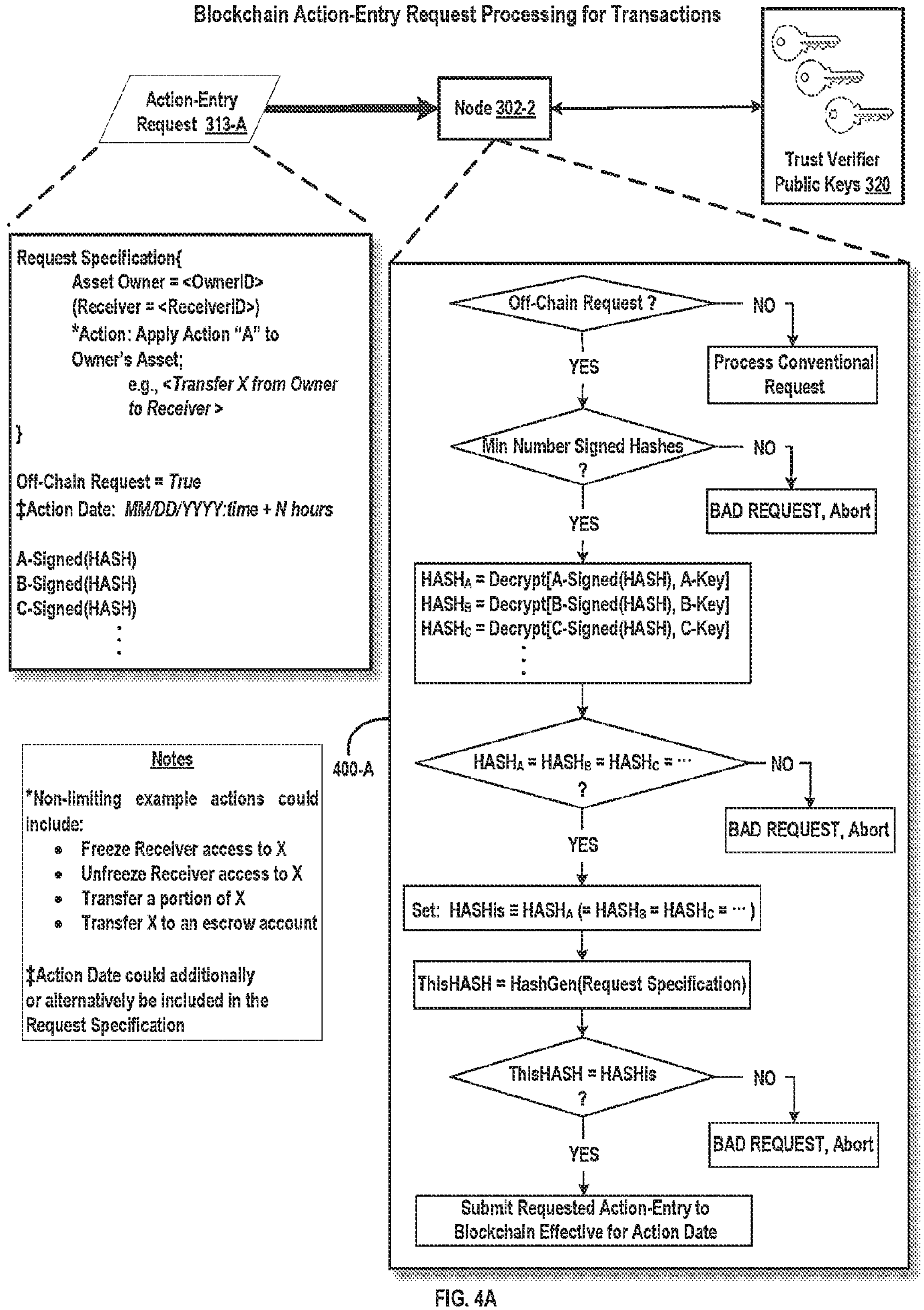
FIGS. 4A and 4B illustrate a two representations of example processing by a system-level implementation of an action-entry request, in accordance with example embodiments.

FIG. 4A illustrates a representation of example processing of a system-level action-entry request by a blockchain node for a transaction scenario, in accordance with example embodiments. For this example, the action-entry request is labeled 313-A. By way of example and for purposes of illustration, only one node, node 302-2, is considered. It should be understood that any node receiving the action-entry request 313-A would apply the same rules in processing the request. In the figure, an expanded but still simplified view of the action-entry request 313-A is presented. By way of example, the expanded action-entry request 313-A for the transaction scenario includes a request specification, an off-chain request indicator, an action date, and the signed HASHes A-Signed (HASH) 311-A, B-Signed (HASH) 311-B, the C-Signed (HASH) 311-C (as well any additional signed HASHes, as indicated by the vertical ellipses). It should be understood that there could be additional information included as well, and that the format of the request is conceptually representational, and does not necessarily correspond to that of an actual implementation.

Also by way of example, the request specification is shown as including an identity of an asset owner and a description of an action to be applied to the asset(s) of the owner; a receiver may optionally be supplied if the action is a transfer from the owner to the receiver, for example. An example action for a transfer of "X" from the owner to a receiver is illustrated. In this example request specification, it is assumed that the receiver previously transferred some portion of digital assets to the owner, and is now requesting X amount of that transfer to be returned via the requested action. As shown, the off-chain request indicator is set to "true," signifying that this is an off-chain request that follows rules established in accordance with example embodiments of the system-level implementation.

The action date is a parameter that sets a future date/time at which to carry out the requested action. Stipulating a future date for carrying out the action may introduce a further safeguard against possible corruption or misuse of the system-level procedures that produced the action-entry request 313-A and delivered it to the blockchain network 302. For example, if an illegitimate request somehow gets validated and entered into the blockchain, a delay in carrying out the action built into the node protocol provides time to discover and correct the error before the action takes effect. A future date may also enable any party to the requested action to dispute the authorization to implement the action. For example, if an action aims to reverse the effect of a transfer from a receiver to an owner by compelling a future reverse transfer, and the owner wishes to dispute the terms or evidence presented to a court that rendered the decision to grant the request for the reverse transaction, a built-in delay provides time for the owner to present a case to deny the request. An action date could be specified as an amount of time past a particular date. By way of example, the amount of time could be 72 hours, seven days, or 30 days. Other amounts of time could be used.

In some usage scenarios, more than one action date may be specified. For example, an immediate freeze of 72 hours may be applied to a receiver's account, with a follow-on date of an additional 30 days to fully resolve the correctness and/or legitimacy of an action request. Other timing arrangements are possible as well, and example embodiments are not limited to any particular timing arrangement. Rather, any variety of timing arrangements are within the scope of example embodiments.

As indicated in the box labeled "Notes," the example action included in the request specification is non-limiting. Other non-limiting examples include freezing or unfreezing the owner's access to X, transferring just a portion of X, and transferring X from the owner to an escrow account. Other actions may be possible as well. As also indicate in the Notes, the action date (or an actions date) could additionally or alternatively be included in the request specification. If additionally included in the request specification, a prescribed rule may be applied to determine which of multiple action dates takes precedence or an unalterable minimum delay may be required in the node protocol. Or multiple action dates could have different effects depending on whether they are included in, or place outside of, the request specification.

Example processing of the action-entry request 313-A by the node 302-2 is represented in a flow chart 400-A shown beneath the node 302-2. Upon receiving the action-entry request 313-A, the node 302-2 may not immediately know that the request is for creating a compulsory entry that implements a compulsory action. In accordance with example embodiments, an initial check is made to determine whether the request is an off-chain request or a conventional request. This could be done by checking the off-chain request indicator, for example. If it is false, then the node 302-2 may process the request in accordance with blockchain procedures. For this example, in which the off-chain request indicator is true, the node 302-2 may continue with off-chain request processing.

In accordance with example embodiments, for off-chain request processing, the node 302-2 may next determine if the action-entry request 313-A includes a required minimum number of signed HASHes. More particularly, requiring the inclusion of a minimum number of signed HASHes can significantly reduce the probability of a successful hack or corruption of the trust verifiers. For example, in a simple analysis, if the probability of a successful hack of a trust verifier is 0.01 (1%), for example, then the probability that N of them are hacked is (0.01) N, which becomes vanishingly small as N increases. The minimum number requirement may therefore be considered one of multiple safeguards against successful hacking or other forms of corruption of the process. As indicated, if the minimum number requirement is not met, the request is considered "bad" and processing may be aborted. Otherwise, processing continues.

In further accordance with example embodiments, if the minimum number requirement is satisfied (met), the node 302-2 may then decrypt each signed HASH using the trust verifiers respective public keys 320, which are assumed to be known and/or available to the node 302-2. For the example illustrated in FIGS. 3 and 4A, the decrypted HASHes are expressed, as shown, as:

$$HASH_A = \text{Decrypt}[A\text{-Signed}(HASH),\ A\text{-Key}]$$

$$HASH_B = \text{Decrypt}[B\text{-Signed}(HASH),\ B\text{-Key}]$$

$$HASH_C = \text{Decrypt}[C\text{-Signed}(HASH),\ C\text{-Key}],$$

where A-Key is the public key of trust verifier A 312-A, and likewise for trust verifiers B and C, 312-B and 312-C. The vertical ellipses indicate similar decryptions of additional signed HASHes that may be included in the action-entry request 313-A.

In accordance with example embodiments, the node 302-2 may next test to ensure that all of the decrypted HASHes are identical. That is, a check that:

$$HASH_A = HASH_B = HASH_C.$$

Requiring that all the HASHes are identical even further reduces the likelihood of a successful hack or corruption of any of the trust verifiers. This is because a successful hack of the HASH provided by any less than all of the trust verifiers would cause this test to fail, thereby exposing the hack. Only an identical hack of all of the trust verifiers might enable the test to pass. However, as noted, the minimum number requirement helps make this extremely unlikely, if not virtually impossible. As indicated, if the identical HASH test fails, the request is considered "bad" and processing may be aborted. Otherwise, processing continues.

In further accordance with example embodiments, if the identical HASH test passes (i.e., if all the decrypted HASHes are identical), the node 302-2 may then take each identical decrypted value to be the true value of the HASH. Thus the node 302-2 may assign the value of $HASH_A$ (or, equivalently, $HASH_B$ or $HASH_C$, and so on) to a variable called, by way of example, "HASHis."

In accordance with example embodiments, the node 302-2 may next carry out its own computation of the one-way hash function applied to the request specification in the action-entry request 313-A in order to determine a "local" value of the HASH. This computation is the same one performed by the off-chain request application 304 that initiated the off-chain request, as described above. The computation may utilize any standard and/or known one-way hash function that meets a specified level of complexity. Non-limiting examples of such one-way hash functions include SHA-256, SHA-512, RIPEMD-320, and Whirlpool. As indicated in the flow chart 400-A, the local HASH is referred to as "ThisHASH."

In further accordance with example embodiments, the node 302-2 may then test that ThisHASH is identical to HASHis. That is, the locally-computed HASH is equal to the HASH provided independently by all of the trust verifiers. A successful outcome of this test now validates the request specification, since ThisHASH is verifiably derived from the request specification, and agrees with the HASH from each of the trust verifiers. As indicated, if ThisHASH does not equal HASHis, the request is considered "bad" and processing may be aborted. Otherwise, processing continues.

Finally, if ThisHASH is confirmed to be identical to HASHis, the node 302-2 may submit the requested compulsory entry to blockchain, with an effective date for the action as specified in the action-entry request 313-A.

While the above description applies to processing of just the one example node 302-2, when the action-entry request 313-A is submitted to the blockchain network 302 by way of one of the nodes, it may be propagated to all or some number of the node. Each node that receives the action-entry request 313-A may process it as described for node 302-2. If a majority of the nodes agree that the requested entry is valid, they may all submit it to a pool of "candidate" entries (e.g., candidate transactions). In conventional processing, the entry may be placed in a prospective new block processed by a miner. Successful mining may then record the action as effectively carried out in a new block of the blockchain.

2. Example System-Level Scenario for Smart Contracts on the Blockchain

In an example smart contract scenario, the parties to a prior smart contract may, again, each be blockchain users, and the designated, trusted off-chain authority may, again, be a judicial court represented by individual judges. As a simple example for the purposes of illustration the parties may be "user A" and "user B," and the prior smart contract may apply an agreement of user A to supply a service to user B, and an agreement of user B to transfer digital asset money to user A upon delivery of the service. A first contingency action of the smart contract may be a notification that A has completed the service, and a second might be a transfer of funds from B to A. The designated caller of the first contingency action could be A, and the designated caller of the second contingency action could be B. In an example, after A calls the service-complete action, B may refuse call the payment action, thereby refusing to pay A for the service. User A or a legal representative of user A (e.g., a lawyer) may then request that the court act as an authorized alias for user B to cause the second contingency action to execute.

More specifically to the example transaction scenario, the requested-action input 301 may include a link to the smart contract, an identification of the contingency action requested, and an identification of the caller—user B in this example. User A's identity may also be included, if necessary, as well as any parameters of the contingency action that may be needed. All of the operations of the transaction scenario described above in connection with FIG. 3 may then apply as well to the smart contract scenario. Besides the requested-action input 301, the primary differences relate to content (and possibly format) of the request specification, the enforcement action specification, and the contents of the action-entry request 313.

In this example smart contract scenario, a court would be asked to issue an order compelling the payment contingency action of the smart contract. Assuming the court agrees, the verification procedures described above for the transaction scenario would be carried out in the same way. The action-entry request 313 generated and sent (input) to the blockchain network 302 would be configured to cause the node(s) of the blockchain 302 to accept or allow the court to act as an authorized alias for calling the payment contingency action.

Each node that receives the action-entry request 313 may further generate its own local version of the HASH by applying a one-way hash function to the request specification in the received action-entry request 313. Again, this allows the node to confirm that the requested action is not only authentic and authorized, but also comports exactly with the action requested and granted by the designated off-chain trusted authority. Each node may then process the request and submit the requested action for entry into the blockchain just as it would for any requested action or transaction submitted by blockchain users. In this way, the request action may be effectively carried out and recorded in the blockchain. Again, each of the trust verifiers need not be individually trusted, as at least a majority of the trust verifiers agreeing on the value of HASH provides a collective level of trust across all of the trust verifiers.

Figure 4B:
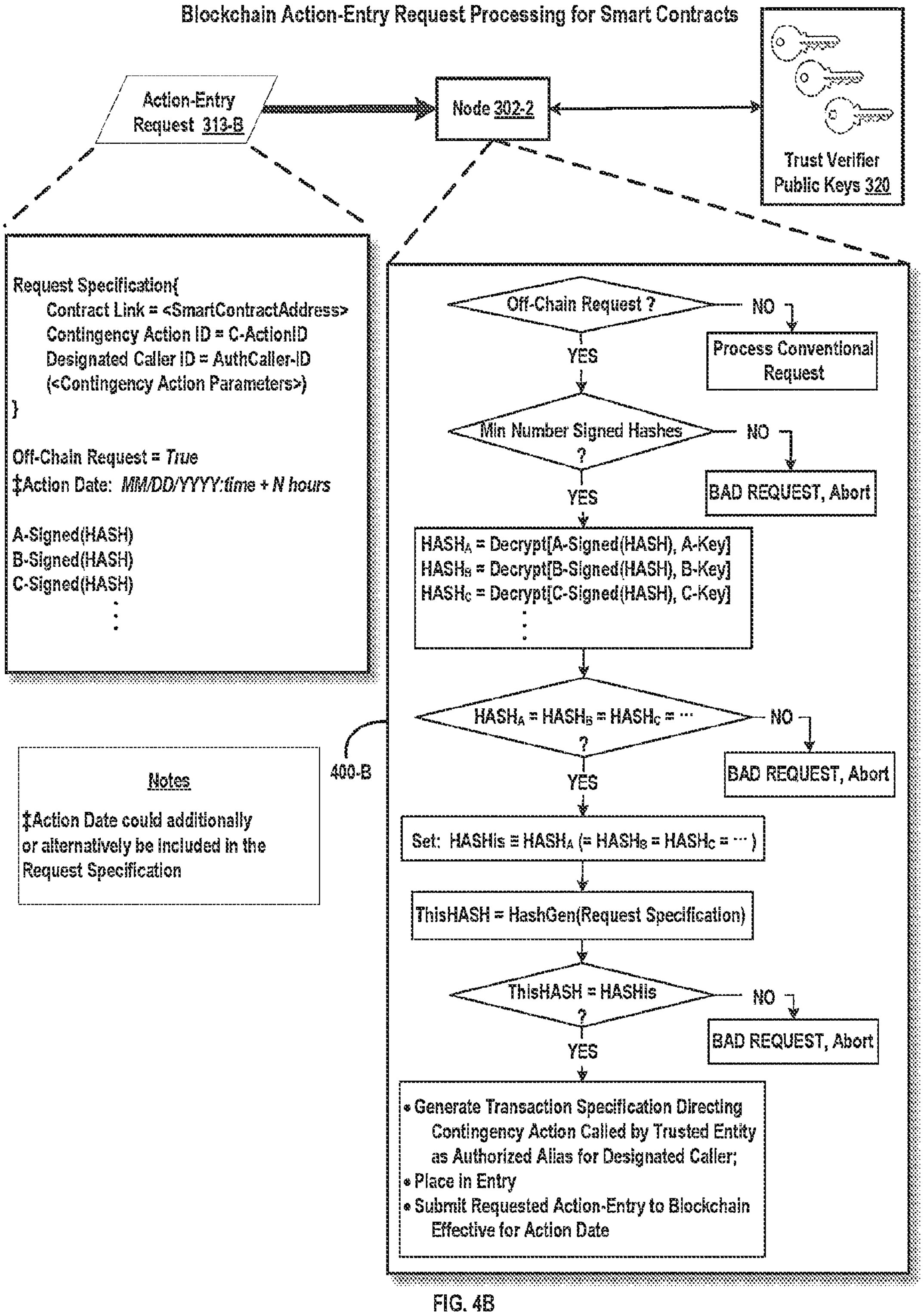

FIG. 4B illustrates a representation of example processing of a system-level action-entry request by a blockchain node for a smart contract scenario, in accordance with example embodiments. For the example smart contract scenario, the action-entry request is labeled 313-B. By way of example and for purposes of illustration, only one node, node 302-2, is considered. It should be understood that any node receiving the action-entry request 313-B would apply the same rules in processing the request. In the figure, an expanded but still simplified view of the action-entry request 313-B is presented. By way of example, the expanded action-entry request 313-B for the smart contract scenario includes a request specification, an off-chain request indicator, an action date, and the signed HASHes A-Signed (HASH) 311-A, B-Signed (HASH) 311-B, the C-Signed (HASH) 311-C (as well any additional signed HASHes, as indicated by the vertical ellipses). It should be understood that there could be additional information included as well, and that the format of the request is conceptually representational, and does not necessarily correspond to that of an actual implementation.

By way of example, the request specification for the example smart contract scenario is shown as including a link to the smart contract, an identification of the contingency action, an identification of the designated caller of the contingency action, and (possibly optionally) parameters of the contingency action. Other information might be included as well, such as identification of one or more other parties to the smart contract, for example. An identity of an asset owner and a description of an action to be applied to the asset(s) of the owner, as well as a receiver, may optionally be supplied if the action is a transfer from the owner to the receiver, for example. As shown, the off-chain request indicator is set to "true," signifying that this is an off-chain request that follows rules established in accordance with example embodiments of the system-level implementation.

The action date is a parameter that sets a future date/time at which to carry out the requested action. In the example smart contract scenario, the requested action is the contingency action. As indicated in the box labeled "Notes," the action date (or dates of one or more actions) could additionally or alternatively be included in the request specification. If additionally included in the request specification, a prescribed rule may be applied to determine which of multiple action dates takes precedence. Or multiple action dates could have different effects depending on whether they are included in, or place outside of, the request specification.

Example processing of the action-entry request 313-B by the node 302-2 is represented in a flow chart 400-B shown beneath the node 302-2. In this example illustration, all of the steps of the flow chart 400-B for the smart contract scenario are the same as those in the flow chart 400-A for the transaction scenario, except for the final step. Specifically, for the smart contract scenario, if ThisHASH is confirmed to be identical to HASHis, the node 302-2 may generate a transaction directing that the contingency action be called by the trusted entity (e.g., the court) acting as an authorized alias for the designated caller. The transaction may be placed in an entry, which may then be submitted for entry in the blockchain, with an effective date for the action as specified in the action-entry request 313-B. When the entry with the requested transaction is placed in the blockchain (e.g., after mining the block in which the entry is placed), the transaction will run, causing the contingency action to execute.

3. Example Variations

As discussed above, the system-level implementation is designated as such because it entails modifying the behavior and/or operations of all blockchain nodes to be able to carry out the processing of action-entry requests just described by way of example. In the context of blockchain-based technologies, such modifications may involve adjusting and/or updating rules that all the nodes agree (or are bound) to follow. Accordingly, the introducing of the functions and operations of the system-level implementation to an existing blockchain may require a hard fork of the existing blockchain. The advantages and benefits of enabling a trusted off-chain entity, such as a judicial institution, to cause remedial actions that rectify otherwise irreversible blockchain actions and/or transactions, and to do so securely, reliably, and in a manner highly resistant to hacking or corruption, while also maintaining the decentralized, distributed nature of blockchain technology, may supply more than adequate impetus for such a hard fork to be adopted in favor of the pre-fork blockchain or for the community of miners to adopt the system-level implementation via a soft fork.

There may be a number of additional and/or alternative aspects of implementing a system-level embodiments. Some non-limiting examples are next described.

Instead of, or in addition to, using a hash of the request specification, the off-chain request application 304 or the off-chain trusted authority server 306 could create a form of encoded "action-payload" that represents the request action in some other way. Non-limiting examples include: a semantic representation of the request specification created by the off-chain trusted authority according to a prescribed formula or application program; and a semantic representation of the request specification generated by an artificial intelligence engine using the request specification as input, for example. More particularly, a semantic representation of the request specification could represent a requested action in a symbolic form that is interpretable by a computing device. By way of example a semantic representation could be encoded as text string or string of characters, such as the following:

{"judicialEventId":"0x4176cd550cb468ed686d0462df28b4a162c7a743",
"judicialDistrict":"USDC-NDOI","caseNumber":"09-cv-05453",
"judicialAction":"freeze",
"fromWallet":"0xF0b874003ECF7fb973a71B2Dbd0F656666809F35",
"toWallet":"0x05113E5A814b6162D85322f3D86868e36FB18E34",
"coinId":"0xa0b86991c6218b36c1d19d4a2e9eb0ce3606eb48",
"amount":25.0}.

In this illustrative example, which assumes the trusted authority is a judicial court, various identifiers that tag parameters of the request specification may be recognizable by node processing.

For the sematic representation embodiment, a node may not necessarily need to generate a hash, but instead confirm that it recreated the sematic representation. Once confirmed, the node may interpret the sematic representation to determine what action or actions are being requested, and prepare a transaction accordingly.

As another example variation, instead of, or in addition to, the off-chain trust verifiers, each of one or more nodes may incorporate functionality of a trust verifier. In this embodiment, a node may be "self-trusting" such that its own retrieval of the HASH or other form of action-payload from the published enforcement actions server 308 suffices to verify the authenticity of the retrieved data. Consequently, the action-entry request 313 need not necessarily include multiple signed HASHes or other action-payloads. The effect of multiple retrievals from the published enforcement actions server 308 (or the like) by different entities may instead be realized by all or a threshold number of multiple nodes agreeing that their respective retrievals agree. This could follow from "majority" rules of blockchain nodes, for example.

In still another example variation, multiple retrievals of the HASH or other action-payload need not necessarily require unanimous agreement. Instead, majority agreement could suffice. Or a threshold number of agreements could be specified. The threshold could correspond to a majority number, or some other specific number. Still further, the particular trust verifiers (or other retrievers, such as nodes) whose retrieved, signed HASHes are compared to test for identical values could be identified specifically or chosen at random. Other arrangements are possible as well.

A further example variation may involve implementing the verification actions of the nodes, such as those described by way of example above, in one or more miners of a blockchain network. In this way, even though processing by miners occurs only after the nodes or trust verifiers have verified and validated a requested action for entry in a block, the miner could perform another check before expending time and effort mining. This could serve as an additional safeguard against hacking or corruption. Since such validation/verification may be part of blockchain operation, the system-level operations for transactions and/or smart contract of example embodiments here would be at least as secure and safe against hacking and corruption such operation, if not more.

In still further example variations, authority to compel an entry on the blockchain could be vested in an entity that may initiate procedures for creating an action-entry request 313, or the like, independently of any request made by a blockchain user. Each such request would still be subject to the case-by-case safeguards described above, but could originate directly from the entity.

In yet another example variation, node procedures may be modified to autonomously insert a prescribed set of special contingency actions in all smart contracts. These could be actions deemed to be mandatory for all smart contracts, and would provide the ability to subject all smart contract to these contingencies.

It will be appreciated that the operations and procedures illustrated in FIGS. 3, 4A, and 4B may be straightforwardly modified, adapted, and/or extended to correspond to any one or more to the example variations described above. That is, the particular form and contents of FIGS. 3, 4A, and 4B apply to just one example of operation of a system-level embodiment, and not intended to be limiting with respect to other possible embodiments.

B. Example Operations

Figure 5:
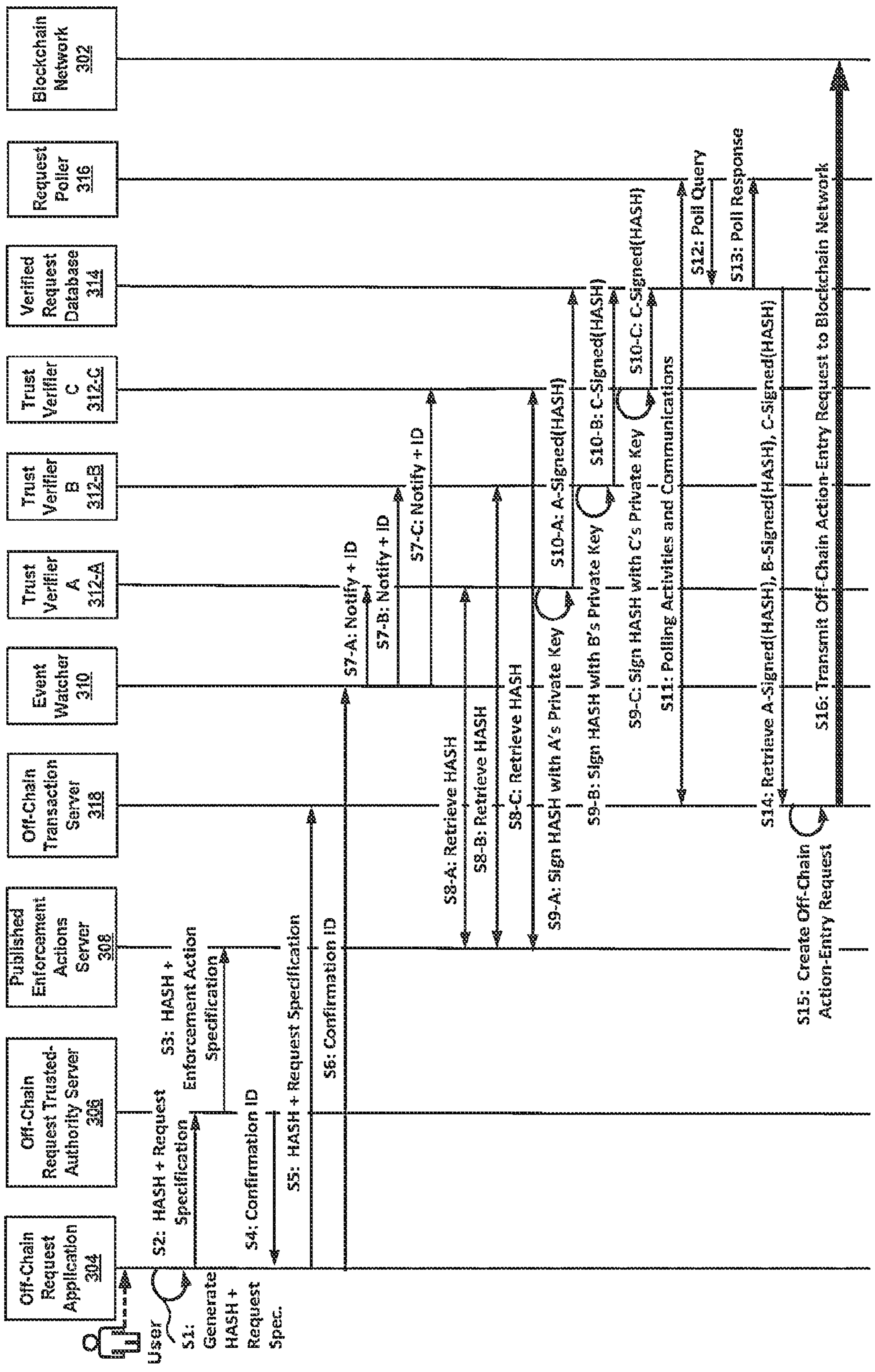
FIG. 5 illustrates an example message flow diagram associated with various aspects of a system-level operations, in accordance with example embodiments.

Example operations of a system-level implementation may be illustrated in a message flow diagram. An example of such a diagram is depicted in FIG. 5. More particularly, the message flow diagram of FIG. 5 depicts example operational sequence timelines of the various components and elements of an example system-level implementation example system shown in FIG. 3 in the context of information (e.g., messages) that passes between them. The example message flow diagram may be considered as applying to the system-level implementation examples of both the transaction scenario and the smart contract scenario. The differences, again, being the content and format of: the requested-action input 301, the request specification, the enforcement action specification, and the action-entry request 313.

Each component of FIG. 3 is represented by a labeled box at the top of FIG. 5. A vertical timeline extends below each component, with time increasing downward. The timelines are not intended to convey or represent precise timing, but rather an ordering or sequence of operations. The operations are shown as horizontal directed arrows between pairs of components, and labeled as "S<n>" followed by a description of the information passed between the components (and where <n> is a numeric label). Some operations are shown as self-directed arrows for operations that are carried out at one component, without necessarily involving passing information to another component. It should be understood that the particular sequences shown in FIG. 5 represent one example of operational flow, and should not be taken as limiting or as excluding other sequences or sequence orders that may achieve the same results.

An example usage scenario may begin with a user providing input, such as the requested-action input 301 of FIG. 3, to the off-chain request application 304 (the UI 304-I/F has been omitted from FIG. 5 for the sake of clarity). At step S1, the off-chain request application 304 generates a HASH plus request specification and at step S2 it sends (e.g., transmits or provides) the HASH plus the request specification to the off-chain trusted-authority server 306. Assuming the request is granted (e.g., after evaluation by a judge, for example; this action not explicitly shown in the figure), the off-chain trusted-authority server 306 may at step S3 post or publish a HASH plus enforcement action specification to the published enforcement actions server 308. At step S4, the off-chain trusted-authority server 306 may send or provide a confirmation ID to the off-chain request application 304.

The off-chain request application 304 may then send (or provide) the HASH plus request specification to the off-chain transaction server 318 at step S5, and send (or provide) the confirmation ID to the event watcher 310 at step S6.

In response to receiving the confirmation ID, the event watcher 310 may separately notify each of the trust verifiers A, B, and C, 312-A, 312-B, and 312-C, in steps S7-A, S7-B, and S7-C, respectively. Each notification may also include (or be) the confirmation ID, or some other identifier suitable for retrieving information from the published enforcement actions server 308.

At steps S8-A, S8-B, and S8-C, the trust verifiers A, B, and C separately and independently interact with the published enforcement actions server 308 to separately and independently retrieve the HASH. The double arrows of these interactions represent possible two-way communications involved in this retrieval process.

At step S9-A, the trust verifier A signs the HASH with its private key, and at step S10-A, it sends (provides) the A-signed (HASH) to the verified request database 314 for recording or storage. Similarly, at step S9-B, the trust verifier B signs the HASH with its private key, and at step S10-B, it sends (provides) the B-signed (HASH) to the verified request database 314 for recording or storage; and at step S9-C, the trust verifier C signs the HASH with its private key, and at step S10-C, it sends (provides) the C-signed (HASH) to the verified request database 314 for recording or storage. Since the trust verifiers act independently, the sequence ordering shown should be considered just one possible example. In terms of processing logic, it may only be required that cryptographic signing of the HASH at step S9-<A,B,C> precedes sending the signed HASH to the verified request database 314 at step S10-<A, B,C>.

Step S11 represents polling activities of the request poller 316 and its communications with the off-chain transaction server 318. Within this context, the off-chain transaction server 318 may advise the request poller 316 to poll the verified request database 314 for the presence and/or availability of the signed HASHes. Thus, at steps S12 and S13 the request poller 316 may engage in this polling, and eventually determine when the signed HASHes are available for retrieval from the verified request database 314.

At step S14, the off-chain transaction server 318 may retrieve the signed HASHes from the verified request database 314 in a "pull" action, for example. It may be noted that this differs somewhat from FIG. 3, which suggests that the request poller 316 retrieves the signed HASHes and provides them to the off-chain transaction server 318. This illustrates an example the types of variations in processing that may be used to achieve the same or similar results.

At step S15, the off-chain transaction server 318 creates (or generates) the off-chain action-entry request, and at step S16 sends the request to the blockchain network 302. The nodes of the blockchain network 302 may the process the request as described by way of example above in connection with FIGS. 4A and/or 4B.

Although the structure and contents of the off-chain action-entry request, and the modifications to the blockchain rules and node operations incorporate particular novel aspects of example embodiments of the system-level implementation that introduce many of the advantages and benefits of the system-level implementation, the operations described by way of example above in connection with creating an off-chain action-entry request and delivering it to the blockchain network facilitate the security and safeguards at least equal to, if not surpassing, that of conventional blockchain operations. And as noted, this is achieved without sacrificing the distributed and decentralized operational architecture of blockchain-based technologies.

As with FIGS. 3, 4A, and 4B, FIG. 5 may be modified, adapted, and/or extended to correspond to any one or more to the example variations described above. That is, the particular form and contents of FIG. 5 apply to just one example of operation of a system-level embodiment. But the particular form and contents of FIG. 5 are not intended to be limiting with respect to other possible embodiments.

IV. EXAMPLE ENTRY-LEVEL IMPLEMENTATION

In accordance with example entry-level embodiments, the functionality of contingency actions of blockchain smart contracts may be extended to take direction to execute by off-chain trigger codes supplied by a trusted off-chain authority, and authenticated, verified and stored in a trusted and secure database known to and accessible by nodes of the blockchain. In particular, the capabilities introduced in accordance with example entry-level embodiments do not involve or require modifying node operations at a system level. Rather, the capabilities are introduced by "connecting" certain node operations to trusted database that serves as a sort of repository of trigger codes supplied by the trusted off-chain authority. Example entry-level embodiments put in place a set of procedures and protocols that safeguard the integrity and validity of the trigger codes in the repository, while at the same time leaving node operation unchanged, leaving the distributed and decentralized operating principles of the blockchain in place and undisturbed.

As described above, the conventional model of a blockchain transaction involves some form of digital token(s) and an owner of the token(s) that has the authority to use—or "transact with"—the digital token(s). A token may have some inherent value, or be imbued with value, by virtue of its usefulness in transactions. For example, digital tokens may be traded for real goods and services. Non-limiting examples of digital tokens in this context include digital currency and NFTs. While the term "token" accommodates a level of generality in describing transactions on a blockchain, the illustrations herein are described by way of example mostly in terms more specifically suggestive of value. Accordingly, in the remaining discussion the term "asset" is used instead of "token" as a sort of reminder of the usefulness in transactions. It should be understood, however, that there is no loss in generality by this particular choice of terminology.

Thus, an owner of an asset or assets that has the authority to use those assets in transactions on the blockchain. That is, these assets—referred to herein as "conventional" (digital) assets—may hold or represent useable value, such as for making purchase, but are not themselves associated with any functionality. In accordance with example embodiments, conventional digital assets may effectively be "converted" in a form that retains its value and adds particular functional capabilities associated with transactions. The converted assets may thus be used in transactions in the same way as their unconverted, conventional instantiations can, but they may also be subject to one or another set of specific actions that are callable only by applying authenticated, validated, and verified trigger codes. Further, all instances of actual trigger codes must be generated on a case-by-case basis by the off-chain trusted authority, and be specific to a particular owner of the converted assets.

The conventional digital assets may be converted by "wrapping" the conventional assets in executable code that implements the desired functionality. Accordingly, the converted digital assets are referred to herein as "wrapper assets," and the actions that wrapper assets are subject to are referred to herein as "wrapper actions." Non-limiting examples of wrapper actions include transferring from the owner to a specific receiver (e.g., another user or another account), freezing, and unfreezing. In accordance with example embodiments, an owner of conventional assets may convert any portion of them to wrapper assets, and thereafter use them in transactions in the same way as conventional assets may be used. This, then, corresponds to a transaction scenario of the entry-level embodiment.

Similarly to wrapper assets, any contingency action of a smart contract may be constructed to be executed by a specific trigger code. In this case, a trigger code may specify a link to the smart contract, an identification of a particular contingency action, and possible parameters of the contingency action. As in the transaction scenario of the entry-level embodiment, the smart contract scenario of the entry-level embodiment, the trigger codes must be generated on a case-by-case basis by the off-chain trusted authority, but in this case, specific to a particular smart contract. This, then, corresponds to a smart contract of the entry-level embodiment.

For both the transaction scenario and the smart contract scenario, implementations of example of the entry-level embodiments involve components and procedures for ensuring safe and secure creation and storage of authenticated, validated, and verified trigger codes. Thus, example embodiments ensure that the flexible and versatile functionality introduce by wrapper digital assets and triggered smart contracts is protected from hacking and/or other forms of misuse or corruption.

An example implementation of an entry-level embodiment, referred to as an entry-level implementation, is describe in more detail below.

A. Example System Architecture and Technical Description

Figure 6:
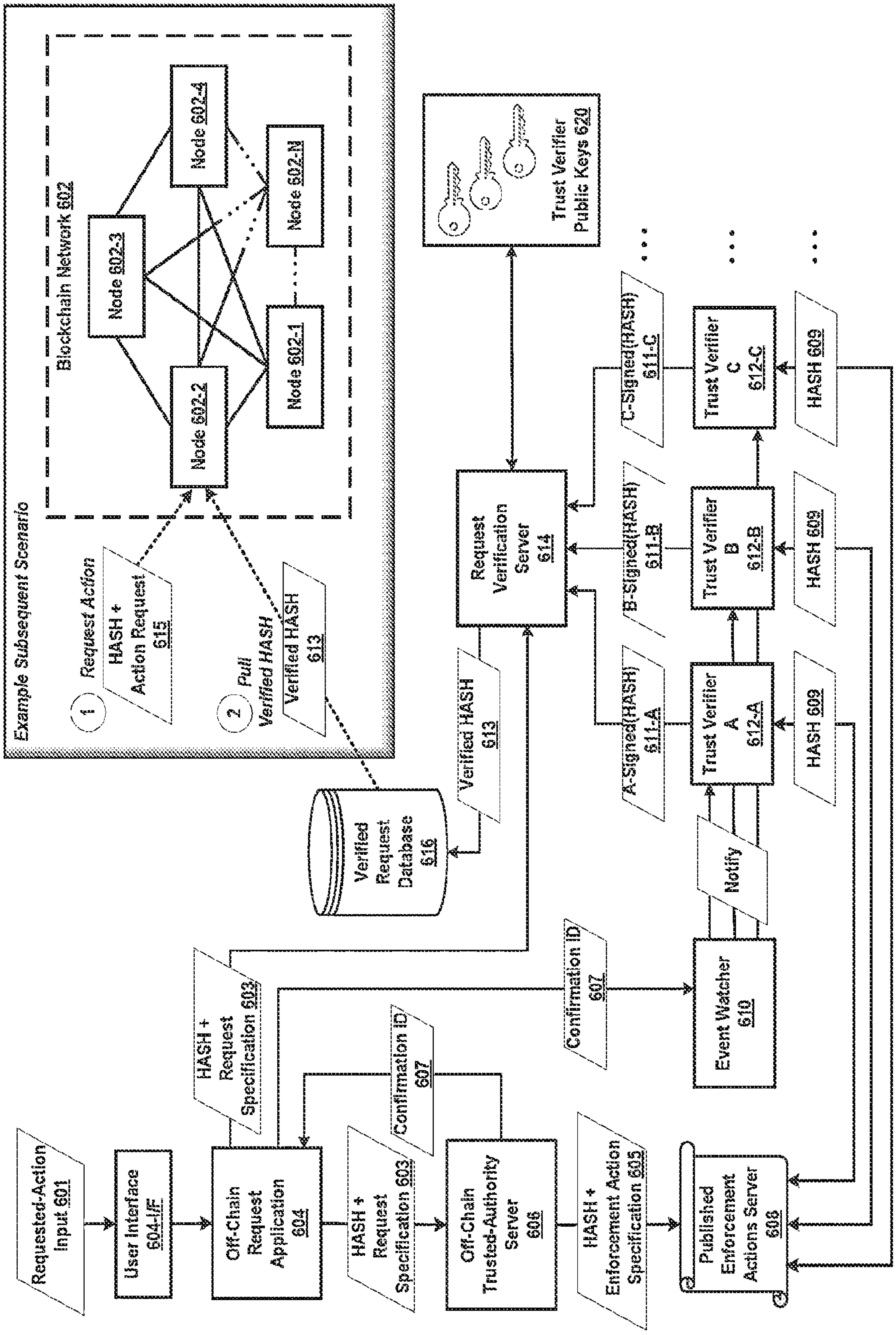
FIG. 6 illustrates a simplified block diagram of another example system in which various operations of an entry-level implementation may be carried out, in accordance with example embodiments.

FIG. 6 is a simplified block diagram showing an example arrangement of components of an entry-level implementation of authenticated off-chain modification of blockchain-based transactions, in accordance with example embodiments. The block diagram of FIG. 6 may also be considered as depicting aspects of an operational architecture of the entry-level implementation. As shown, example embodiments can include various components, any one or more of which may be implemented as or in one or more computing devices. As such, components depicted in FIG. 6 may themselves be or include hardware, software, firmware, or combinations thereof. Some of the components may be identified structurally, such as databases or other forms of data storage and management, and others may be identified in terms of their operation or function. Operational and/or functional components could be implemented as software and/or hardware modules, for example, and may also be referred to as "modules" for the purpose of the present discussion.

The example entry-level implementation can also include one or more connection mechanisms that connect various components. By way of example, the connection mechanisms are depicted as arrows between components. The direction of an arrow may indicate a direction of information flow, though this interpretation should not be viewed as limiting. In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switch, or other network device. Likewise, in this disclosure, communication (e.g., a transmission or receipt of data) can be a direct or indirect communication.

By way of example, various components and entities of the example system-level implementation of FIG. 3 includes a blockchain network 602 having connected nodes 602-1, 602-2, . . . , 602-N, where ellipses in the connections to node 602-N indicate possibly additional connected nodes. Other example components and entities of the example system-level implementation include an off-chain request application 604 with a user interface (UI) 604-I/F, an off-chain trusted-authority server 606, a published enforcement actions server 608, an event watcher 610, trust verifier A 612-A, trust verifier B 612-B, trust verifier C 612-C, request verification server 614, verified request database 616, and trust verifier public keys 620. The ellipses following the trust verifier C 612-C indicates that there could be addition trust verifiers. In an example embodiment, the off-chain request application 604 could be an application program configured for execution on a computing device, such as a PC, laptop, smartphone, or server, among other possible devices.

The computational and/or functional roles of the example components and entities may be understood by considering example operational scenarios involving transactions on the blockchain and smart contracts on the blockchain. Both types of scenarios involve similar, and in some respects the same, operations. However, in order to help keep the distinguishing aspects of the two scenarios clear, operational examples of the two scenarios are described separately below.

1. Example Entry-Level Scenario for Transactions on the Blockchain

In the example transaction scenario of the entry-level embodiment, a sender of a wrapper digital asset to a receiver may seek to reverse the effect of a transaction that transferred the wrapper digital asset from the sender's account to the receiver's account. As in the system-level illustration, the sender may have been tricked or defrauded by the receiver, and thus may look to a judicial court for remediation. In the example transaction scenario of the entry-level embodiment, a remedial action may be ordered by the generation or creation of a trigger code associated with an appropriate contingency action of the wrapper digital asset. For the current example, the remedial contingency action may be a transfer of the wrapper digital asset from the receiver back to the sender. Thus, a trigger code might specify the receiver as the owner of the wrapper digital asset, a transfer action as the contingency action, and the original sender as the target of the requested transfer. This information may be provided as the requested-action input 601, for example.

Thus, the sender or a legal representative of the sender (e.g., a lawyer) may enter a requested-action input 601 at the UI 604-I/F. The requested-action input 601 may include information identifying the sender, the receiver, details about the original transfer from the sender to the receiver, the remedial action being requested, and particular information that provides and/or serves as evidence that the sender was tricked or defrauded into entering in the original transaction. In accordance with example embodiments, the UI 604-I/F may be or include an online form with drop-down menus or the like, for example, that prompt the sender (or other more generally a user) for specific information required to construct a formal request and provide the court with requisite information for evaluating and granting or denying the request.

The UI 604-I/F may provide the requested-action input 601 to the off-chain request application 604, which may then process the request for delivery to the judicial court. Thus, in accordance with example embodiments, the off-chain request application 604 may arrange and/or format all or certain specific items or elements of the requested-action input 601 into request specification, and may then generate a one-way hash of the request specification. As in the discussion of the system-level embodiment, the one-way hash of the request specification is labeled in all capital letters as the HASH. Also for purposes of discussion, the HASH and request specification may be considered together as a data entity referred to as HASH plus request specification 603. It should be understood that this grouping is for convenience in the operational description and need not necessarily be implemented in practice (although the grouping is not necessarily excluded either).

The HASH plus request specification 603 may then be provided to the off-chain trusted-authority server 606. In an example in which the trusted authority is a judicial court, the off-chain trusted-authority server 606 could be a server associated with the court and configured for receiving requests for compelling actions to be entered in a blockchain. For example, the off-chain trusted-authority server 606 may implement an API configured for receiving appropriately-formatted HASH plus request specification 603 messages or direct input. In other examples, the off-chain trusted-authority server 606 could be a more general server associated with the court and configured for receiving a variety of court/case-related input, including the off-chain trusted-authority server 606. Other arrangements are possible as well. In some examples, the HASH plus request specification 603 may be provided "manually" to a judicial court, together with supporting evidence for the request, by a legal representative of the sender, for example.

After the HASH plus request specification 303 is received by the off-chain trusted-authority server 606, an evaluation may be made as to whether or not to grant the requested action. Again considering the example in which the trusted authority is a judicial court, the evaluation may be made by a judge or other authorized representative of the court. This aspect may be the same as that described for the system-level embodiment.

Assuming a decision (e.g., by a person or by an algorithm) is made to grant the request, a HASH plus enforcement specification 605 may be posted or published to the published enforcement actions server 608. In the judicial example, the HASH plus enforcement specification 605 may be a human-readable electronic file that articulates the decision and includes an embedded alpha-numeric representation of the HASH. For example, the HASH plus enforcement specification 605 could be a PDF file digitally signed by the court. The published enforcement actions server 608 could be a publically-accessible server to which such decisions, among other forms of court business, are posted. In the example of a judicial court, the published enforcement actions server 608 could be a server such as the PACER server, for example. However, other arrangements are possible as well.

Also with a decision to grant the request, the off-chain trusted-authority server 606 may provide or send (e.g., transmit) a confirmation ID 607 to the off-chain request application 604, which may serve to inform the off-chain request application 604 of the affirmative decision, and provide it with identifying information for accessing the now-published HASH plus enforcement specification 605 at the published enforcement actions server 608.

In accordance with example embodiments, after the off-chain request application 604 receives the confirmation ID 607, it may in turn send the confirmation ID 607 to the event watcher 610. Doing so may alert the event watcher 610 to the availability of the HASH plus enforcement specification 605 at the published enforcement actions server 608. The off-chain request application 604 may then also provide or send (e.g., transmit) the HASH plus request specification 603 to the request verification server 614 to make it, too, aware of the availability of the HASH plus enforcement specification 605 at the published enforcement actions server 608 and to initiate creation of a corresponding trigger code.

The event watcher 610, having been alerted with the confirmation ID, may then independently notify each of the trust verifiers A, B, and C, 612-A, 612-B, and 612-C, as well as any additional trust verifiers, as indicated in FIG. 6. Each trust verifier could be a secure server or other networked secure computing system associated with a respective organization or institution, such as an established bank, brokerage, or network service provider, for example. Although not necessarily shown in the figure, the notification to each of the trust verifiers may also include the confirmation ID or other information enabling access to the HASH plus enforcement specification 605 at the published enforcement actions server 608.

Having been notified, each of the trust verifiers A, B, and C, 612-A, 612-B, and 612-C, as well as any additional trust verifiers, may then independently retrieve the HASH from the published enforcement actions server 608 over respective secure links. Each independent retrieval is shown with a label HASH 609 for purposes of the present discussion; again, the ellipses indicate additional retrievals of HASH 609 from additional trust verifiers. The trusted nature of the trust verifiers, together with secure retrieval allows each trust verify to independently vouch for the authenticity of the retrieved HASH 609. Each trust verifier may do this by encrypting its retrieved HASH 609 with a private cryptographic key that serves as well as an authenticating digital signature. Thus, the trust verifier A 612-A generates the A-Signed (HASH) 611-A; the trust verifier B 612-B generates the B-Signed (HASH) 611-B; and the trust verifier C 612-C generates the C-Signed (HASH) 611-C. Each trust verifier may then provide (e.g., send or transmit) its respectively signed HASH in the request verification server 614. Additional signed HASHes may be provided to the request verification server 614, as indicated (once more) by the ellipses.

The request verification server 614 may then carry out operations to verify and validate the HASH and an authenticated, verified, and validated trigger code, and store it in the verification request database. At this point, the trigger code is available triggering an action associated with the request-action input 601. For this example, the trigger code, as noted above, might specify the receiver as the owner of the wrapper digital asset, a transfer action as the contingency action, and the original sender as the target of the requested transfer. In an example embodiment, a verified HASH 613 may serve as the trigger code, and validation and verification processing by the request verification server 614 may be considered validation and verification of the trigger code.

An example subsequent scenario is show in a box enclosing the blockchain network 602 in the upper right of FIG. 6. In a first step, labeled "1," a request action is made by providing node 602-2 with a HASH plus action request 615. The HASH plus action request 615 may alert the node 602-2 to the presence and availability of a trigger code associated with the wrapper assets of the owner as specified in the action request. At a second step, labeled "2," the node 602-2 may then pull the trigger code, which in this example is the verified HASH 613, from the verified request database. Since the database is trusted by the blockchain network 602, the node 602-2 may execute the contingency action associated with the trigger code. In this example, the action causes a transfer of some amount of wrapper assets from the owner to the original sender in the disputed transaction. Some or all of the node processing may be according to blockchain operation. Thus, the HASH plus action request 615 may propagate to all or some number of the nodes, and all that receive it may engage in the processing just described.

Figure 7A:
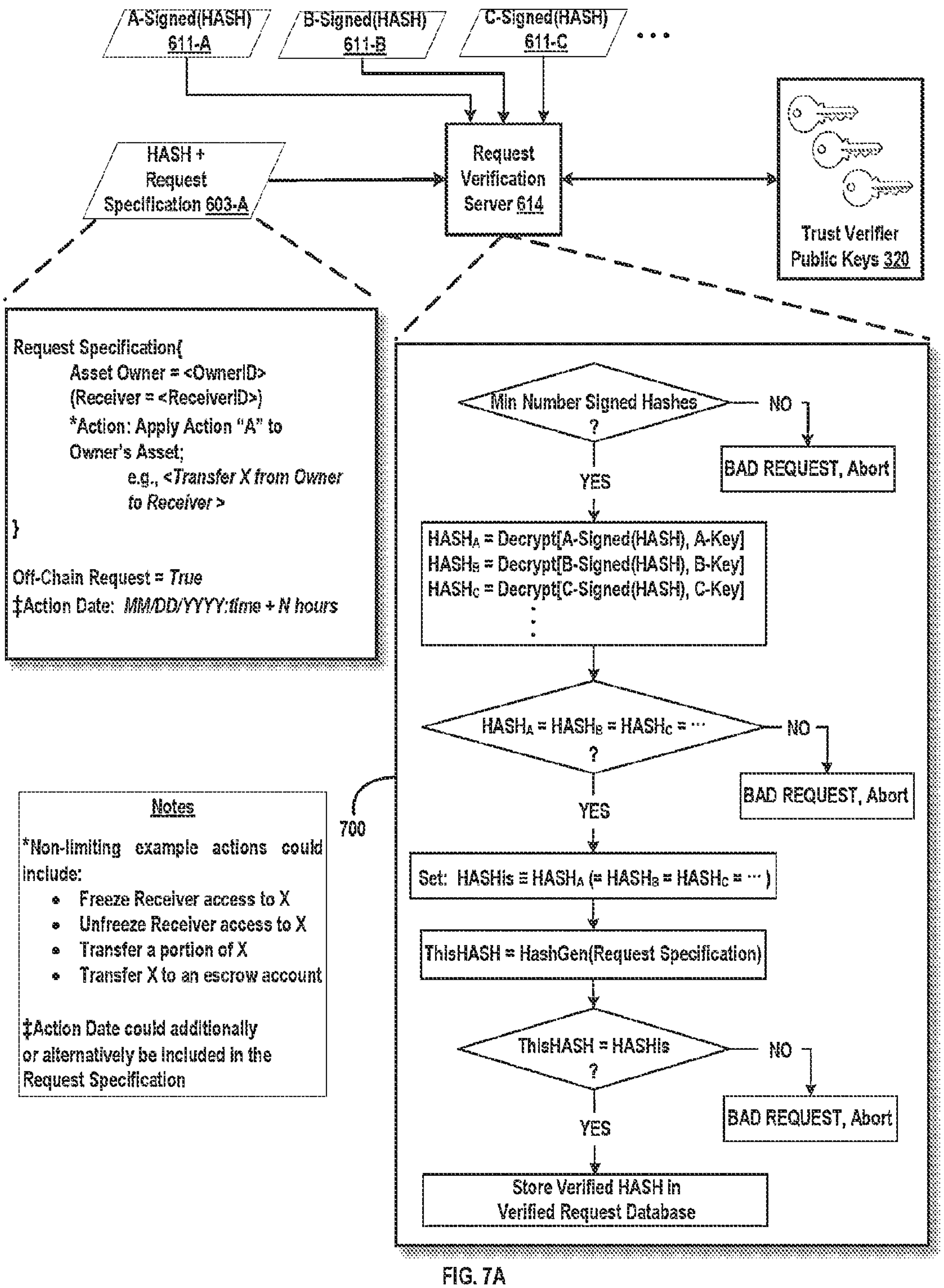
FIGS. 7A and 7B illustrate a two representations of example processing by an entry-level implementation of action-request verification, in accordance with example embodiments.

FIG. 7A illustrates a representation of example processing the request verification server 614 of an entry-level action-entry for a transaction scenario, in accordance with example embodiments. As indicated in FIG. 6, and again in FIG. 7A, the request verification server 614 also receives the signed HASHes A-Signed (HASH) 611-A, B-Signed (HASH) 611-B, the C-Signed (HASH) 611-C (as well any additional signed HASHes, as indicated by the vertical ellipses). In the figure, an expanded but still simplified view of the HASH plus request specification 603-A is presented. By way of example, the expanded HASH plus request specification 603-A for the transaction scenario includes a request specification, an off-chain request indicator, and an action date. It should be understood that there could be additional information included as well, and that the format of the request is conceptually representational, and does not necessarily correspond to that of an actual implementation.

Also by way of example, the request specification is shown as including an identity of an asset owner and a description of an action to be applied to the asset(s) of the owner; a receiver may optionally be supplied if the action is a transfer from the owner to the receiver, for example. Again, the asset in this case is wrapper asset. An example action for a transfer of “X” from the owner to a receiver is illustrated. In this example request specification, it is assumed that the receiver previously transferred some portion of digital assets to the owner, and is now requesting X amount of that transfer to be returned via the requested action. As shown, the off-chain request indicator is set to “true.”

The action date is a parameter that may be used to set a future date/time at which to carry out the requested action. Stipulating a future date for carrying out the action may introduce a further safeguard against possible corruption or misuse of the entry-level procedures that produced the trigger code (verified HASH 613 in this example) and delivered it to the verified request database 614. For example, if an illegitimate request somehow gets validated and entered a trigger code, a built-in delay in carrying out the action provides time to discover and correct the error before the action takes effect. A future date may also enable any party to the requested action to dispute the authorization to implement the action. For example, if an action aims to reverse the effect of a transfer from a receiver to an owner by compelling a future reverse transfer, and the owner wishes to dispute the terms or evidence presented to a court that rendered the decision to grant the request for the reverse transaction, a built-in delay provides time for the owner to present a case to deny the request. Similarly, stipulating a future date may also be a necessary procedure for the trusted authority to act, such as the time to lodge an appeal of a court order. An action date could be specified as an amount of time past a particular date. By way of example, the amount of time could be 72 hours, seven days, or 30 days. Other amounts of time could be used.

As indicated in the box labeled “Notes,” the example action included in the request specification is non-limiting. Other non-limiting examples include freezing or unfreezing the owner’s access to X, transferring just a portion of X, and transferring X from the owner to an escrow account. Other actions may be possible as well. As also indicate in the Notes, the action date (or an actions date) could additionally or alternatively be included in the request specification. If additionally included in the request specification, a prescribed rule may be applied to determine which of multiple action dates takes precedence. Or multiple action dates could have different effects depending on whether they are included in, or place outside of, the request specification.

Example processing by the request verification server 614 is represented in a flow chart 700 shown beneath the request verification server 614. In accordance with example embodiments, the request verification server 614 may determine if it has received a required minimum number of signed HASHes. As explained above, requiring the inclusion of a minimum number of signed HASHes can significantly reduce the probability of a successful hack or corruption of the trust verifiers. As indicated, if the minimum number requirement is not met, the request is considered “bad” and processing may be aborted. Otherwise, processing continues.

In further accordance with example embodiments, if the minimum number requirement is satisfied (met), the request verification server 614 may then decrypt each signed HASH using the trust verifiers respective public keys 620, which are assumed to be known and/or available to the request verification server 614. For the example illustrated in FIGS. 6 and 7A, the decrypted HASHes are expressed, as shown, as:

$$HASH_A = \text{Decrypt}[A\text{–Signed}(HASH),\ A\text{–Key}]$$

$$HASH_B = \text{Decrypt}[B\text{–Signed}(HASH),\ B\text{–Key}]$$

$$HASH_C = \text{Decrypt}[C\text{–Signed}(HASH),\ C\text{–Key}],$$

where A-Key is the public key of trust verifier A 612-A, and likewise for trust verifiers B and C, 612-B and 612-C. The vertical ellipses indicate similar decryptions of additional signed HASHes that may be carried out.

In accordance with example embodiments, the request verification server 614 may next test to ensure that all of the decrypted HASHes are identical. That is, a check that:

$$HASH_A = HASH_B = HASH_C.$$

Requiring that all the HASHes are identical even further reduces the likelihood of a successful hack or corruption of any of the trust verifiers. This is because a successful hack of the HASH provided by any less than all of the trust verifiers would cause this test to fail, thereby exposing the hack. Only an identical hack of all of the trust verifiers might enable the test to pass. However, as noted, the minimum number requirement helps make this extremely unlikely, if not virtually impossible. As indicated, if the identical HASH test fails, the request is considered “bad” and processing may be aborted. Otherwise, processing continues.

In further accordance with example embodiments, if the identical HASH test passes (i.e., if all the decrypted HASHes are identical), the request verification server 614 may then take each identical decrypted value to be the true value of the HASH. Thus the request verification server 614 may assign the value of $HASH_A$ (or, equivalently, $HASH_B$ or $HASH_C$, and so on) to a variable called, by way of example, “HASHis.”

In accordance with example embodiments, the request verification server 614 may next carry out its own computation of the one-way hash function applied to the request specification in HASH plus request specification 603-A in order to determine a “local” value of the HASH. This computation is the same one performed by the off-chain request application 604 that initiated the off-chain request, as described above. The computation may utilize any standard and/or known one-way hash function that meets a specified level of complexity. Non-limiting examples of such one-way hash functions include SHA-256, SHA-512, RIPEMD-320, and Whirlpool. As indicated in the flow chart 700, the local HASH is referred to as “ThisHASH.”

In further accordance with example embodiments, the request verification server 614 may then test that ThisHASH is identical to HASHis. That is, the locally-computed HASH is equal to the HASH provided independently by all of the trust verifiers. A successful outcome of this test now validates the request specification, since ThisHASH is verifiably derived from the request specification, and agrees with the HASH from each of the trust verifiers. As indicated, if ThisHASH does not equal HASHis, the request is considered "bad" and processing may be aborted. Otherwise, processing continues.

Finally, if ThisHASH is confirmed to be identical to HASHis, the request verification server 614 may store the verified HASH 613 in the verified request database 616.

2. Example Entry-Level Scenario for Smart Contracts on the Blockchain

In an example smart contract scenario, a smart contract may be constructed so that the contingency actions may be triggered by trigger codes stored in the verified request database or otherwise provided to the contract. The parties to a prior smart contract may, again, each be blockchain users, and the designated, trusted off-chain authority may, again, be a judicial court represented by individual judges. As in the system-level example, a simple example is considered in which the parties may be "user A" and "user B," and the prior smart contract may apply an agreement of user A to supply a service to user B, and an agreement of user B to transfer money to user A upon delivery of the service. A first contingency action of the smart contract may be a notification that A has completed the service, and a second might be a transfer of funds from B to A. The designated caller of the first contingency action could be A, and the designated caller of the second contingency action could be B. In an example, after A calls the service-complete action, B may refuse to call the payment action, thereby refusing to pay A for the service. User A or a legal representative of user A (e.g., a lawyer) may then request that the court act as an authorized alias for user B to cause the second contingency action to execute.

More specifically to the example transaction scenario, the requested-action input 601 may include a link to the smart contract, and an identification of the contingency action requested, as well as any parameters of the contingency action that may be needed. All of the operations of the transaction scenario described above in connection with FIG. 6 may then apply as well to the smart contract scenario. Besides the requested-action input 601, the primary differences relate to content (and possibly format) of the request specification, the enforcement action specification, and the contents of the greater generality of contingency actions that may be called (for example a variable for the amount or a finding of fact).

In this example smart contract scenario, a court would be asked to issue an order compelling the payment contingency action of the smart contract. Assuming the court agrees, the verification procedures described above for the transaction scenario would be carried out in the same way. The verified HASH 613 would be a trigger for the contingency action requested. The example subsequent action shown in the box in the upper right of FIG. 6 applies in the smart contract scenario as well.

Figure 7B:
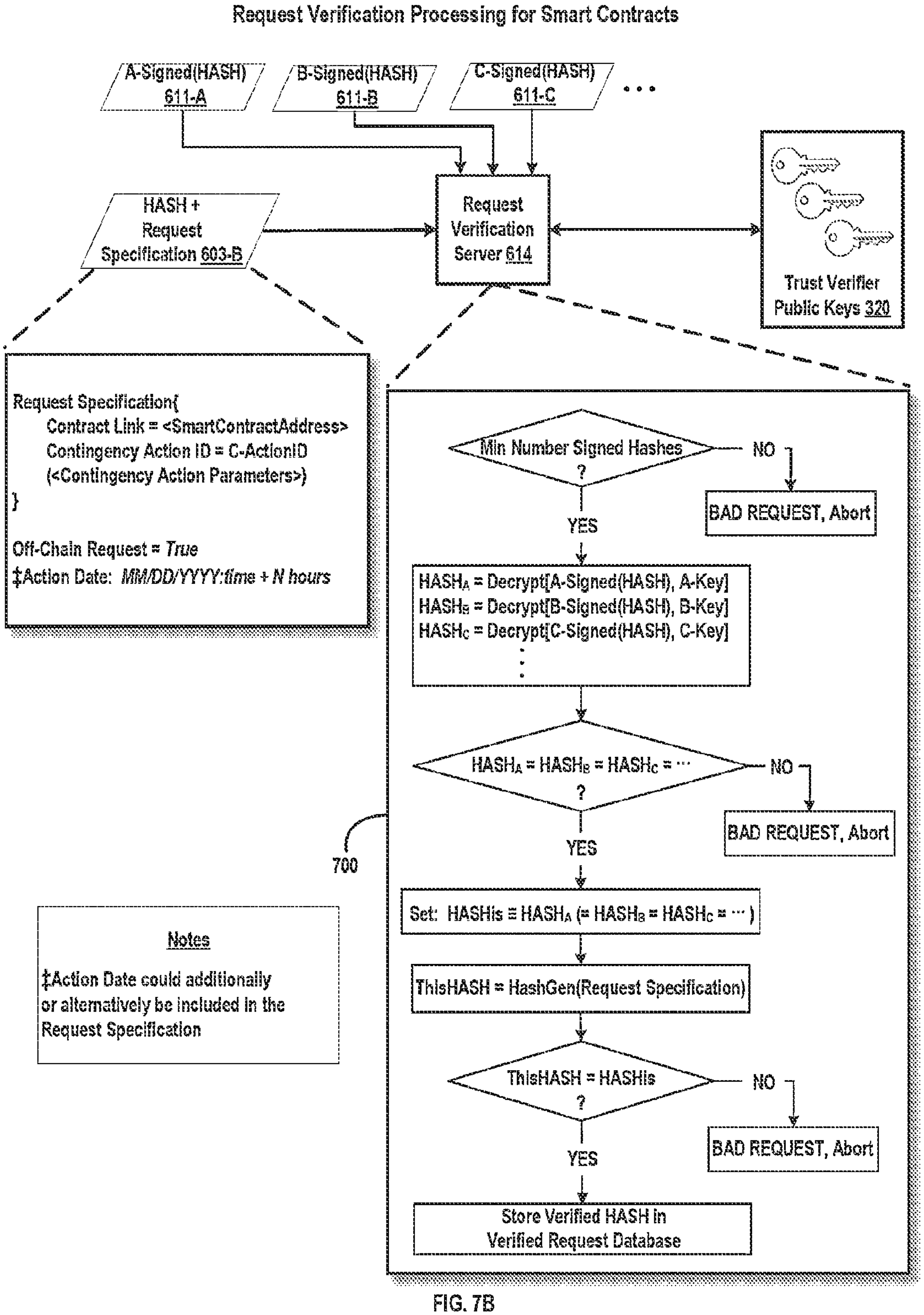

FIG. 7B illustrates a representation of example processing the request verification server 614 of an entry-level action-entry for a transaction scenario, in accordance with example embodiments. The discussion of FIG. 7A applies identically to FIG. 7B, except that the specification request supplies different information. Specifically in the HASH plus specification request 603-B, the request specification for the example smart contract scenario is shown as including a link to the smart contract, and an identification of the contingency action, and (possibly optionally) parameters of the contingency action. Other information might be included as well, such as identification of one or more other parties to the smart contract, for example. An identity of an asset owner and a description of an action to be applied to the asset(s) of the owner, as well as a receiver, may optionally be supplied if the action is a transfer from the owner to the receiver, for example.

3. Example variations

There may be a number of additional and/or alternative aspects of implementing entry-level embodiments. Most are the same as in the system-level embodiment, and so are not repeated again here.

It will be appreciated that the operations and procedures illustrated in FIGS. 6, 7A, and 7B may be straightforwardly modified, adapted, and/or extended to correspond to any one or more to the example variations previously described. That is, the particular form and contents of FIGS. 6, 7A, and 7B apply to just one example of operation of an entry-level embodiment, and not intended to be limiting with respect to other possible embodiments.

B. Example Operations

Figure 8:
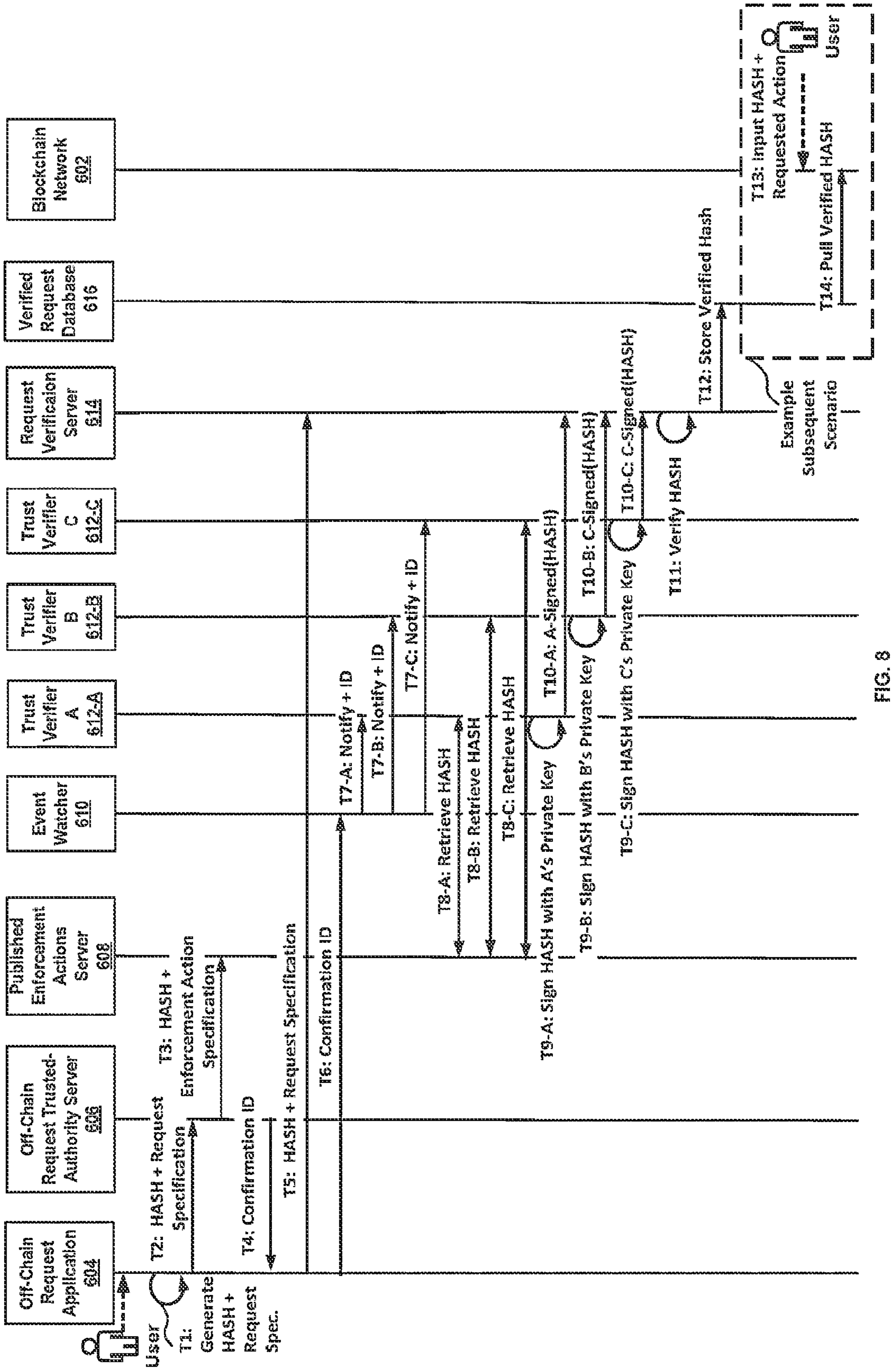
FIG. 8 illustrates an example message flow diagram associated with various aspects of an entry-level operations, in accordance with example embodiments.

Example operations of an entry-level implementation may be illustrated in a message flow diagram. An example message flow diagram for entry-level implementation is depicted in FIG. 8. The format is the same as that described in connection with FIG. 5, except that some of the components are different.

Each component of FIG. 6 is represented by a labeled box at the top of FIG. 8. As in FIG. 5, a vertical timeline extends below each component, with time increasing downward. The timelines are not intended to convey or represent precise timing, but rather an ordering or sequence of operations. The operations are shown as horizontal directed arrows between pairs of components, and labeled as "T<n>" followed by a description of the information passed between the components (and where <n> is a numeric label). Some operations are shown as self-directed arrows for operations that are carried out at one component, without necessarily involving passing information to another component. It should be understood that the particular sequences shown in FIG. 8 represent one example of operational flow, and should not be taken as limiting or as excluding other sequences or sequence orders that may achieve the same results.

An example usage scenario may begin with a user providing input, such as the requested-action input 601 of FIG. 6, to the off-chain request application 604 (the UI 304-I/F has been omitted from FIG. 8 for the sake of clarity). At step T1, the off-chain request application 604 generates a HASH plus request specification and at step T2 it sends (e.g., transmits or provides) the HASH plus the request specification to the off-chain trusted-authority server 606. Assuming the request is granted (e.g., after evaluation by a judge, for example; this action not explicitly shown in the figure), the off-chain trusted-authority server 606 may at step T3 post or publish a HASH plus enforcement action specification to the published enforcement actions server 608. At step T4, the off-chain trusted-authority server 606 may send or provide a confirmation ID to the off-chain request application 604.

The off-chain request application 604 may then send (or provide) the HASH plus request specification to the request verification server 614 at step T5, and send (or provide) the confirmation ID to the event watcher 610 at step T6.

In response to receiving the confirmation ID, the event watcher 610 may separately notify each of the trust verifiers A, B, and C, 612-A, 612-B, and 612-C, in steps T7-A, T7-B, and T7-C, respectively. Each notification may also include (or be) the confirmation ID, or some other identifier suitable for retrieving information from the published enforcement actions server 608.

At steps T8-A, T8-B, and T8-C, the trust verifiers A, B, and C separately and independently interact with the published enforcement actions server 608 to separately and independently retrieve the HASH. The double arrows of these interactions represent possible two-way communications involved in this retrieval process.

At step T9-A, the trust verifier A signs the HASH with its private key, and at step T10-A, it sends (provides) the A-signed (HASH) to the request verification server 614 for recording or storage. Similarly, at step T9-B, the trust verifier B signs the HASH with its private key, and at step T10-B, it sends (provides) the B-signed (HASH) to the request verification server 614 for recording or storage; and at step T9-C, the trust verifier C signs the HASH with its private key, and at step T10-C, it sends (provides) the C-signed (HASH) to the request verification server 614 for recording or storage. Since the trust verifiers act independently, the sequence ordering shown should be considered just one possible example. In terms of processing logic, it may only be required that cryptographic signing of the HASH at step T9-<A,B,C> precedes sending the signed HASH to the request verification server 614 at step T10-<A,B,C>.

At step T11 the request verification server 614 may verify the HASH as described above. At step T12, the request verification server 614 may store the verified HASH as the verified trigger code in the verified request database 616.

An example subsequent scenario is shown in the dashed box in the lower right of FIG. 8. As shown, the input HASH plus requested action is input to the blockchain network 602 as step T13. This could represent a user or a user's legal representative submitting an entry to the blockchain that alerts it to the presence and availability of a trigger code in the verified request database 616. Then at step T14, one or more nodes of the blockchain pull the trigger code (verified HASH in this example) and act on it as described above.

As with FIGS. 6, 7A, and 7B, FIG. 8 may be modified, adapted, and/or extended to correspond to any one or more to the example variations described above. That is, the particular form and contents of FIG. 8 apply to just one example of operation of an entry-level embodiment. But the particular form and contents of FIG. 8 are not intended to be limiting with respect to other possible embodiments.

V. SECURE RETRIEVAL OF OFF-CHAIN DATA BY TRUSTED CHAIN ENTITIES

In the example operation of a system-level implementation discussed above in connection with FIGS. 3 and 5, and also described in the discussion in International Patent App. No. PCT/US22/20033 (which is incorporated herein by reference in its entirety), the published enforcement actions server 308 stores and posts a HASH plus enforcement action specification 305 that is subsequently retrieved by the trust verifiers 312-A, 312-B, and 312-C. The HASH plus enforcement action specification 305 is an example of off-chain data that may be used in blockchain operations, such as causing a transaction to be entered in the blockchain. The trust verifiers 312-A, 312-B, and 312-C serve as trusted retriever's of the off-chain data, and their digital signatures, together with the consistency of the retrieved HASHes serve as verification that the off-chain data has been faithfully retrieved and stored in verified request database 314, from which it may then be retrieved for its intended use in or by the blockchain network 302. In this example implementation, the trust verifiers 312-A, 312-B, and 312-C may be considered off-chain trusted retrievers of off-chain data, in the sense that they may be entities that are deployed and/or operated independently of the blockchain network 302. For example, one or more of the trust verifiers 312-A, 312-B, and 312-C could be servers operated by trusted institutions or organizations, such as banks, brokerages, or other regulated entities. In some examples, one or more trust verifiers could be nodes of the blockchain network (though not necessarily miner nodes selected or assigned in the manner described by way of example below).

In accordance with example embodiments, an alternative form of trusted retrieval of off-chain data may be implemented that may be used to augment and/or replace off-chain trusted retrievers with one or more blockchain entities. In particular, a miner-based retrieval system may be used that maintains a requisite level of trust and authenticity of the retrievers and retrieval process. More specifically, retrieval may allocated or assigned to the miner(s) chosen or assigned to write a block under a consensus-proof method used by the underlying blockchain (e.g., proof of work or proof of stake). In the proof of work model, allocating or assigning retrieval to each miner that solves a block, or effectively only to the miner whose solved block is found to have joined the longest chain after a given number of confirmations, ensures that the retrieval is at least as secure and authentic as the process of mining itself, and correspondingly, as secure as the underlying blockchain.

Accordingly, a system that allocates or assigns retrieval to the miner chosen to write the block advantageously presents a different risk profile than using off-chain retrievers or a plurality of randomly selected nodes (and in longest chain consensus, also accounts for the unknown liveliness of any given node at any given time). Miners may be considered entities of a blockchain, and thus this miner-based retrieval may be considered secure retrieval of off-chain data by trusted chain entities. Example embodiments and usage scenarios are described in the following discussion.

A. Example Judicial Retrieval Process

The example operation of a system-level implementation discussed above in connection with FIGS. 3 and 5 may be referred to "judicial retrieval" to the extent that the off-chain data to be retrieved represents a judicial enforcement action that ultimately directs an action that causes an entry to be added to a blockchain. It may serve as an example of secure retrieval of off-chain data by trusted chain entities, and is described below. It should be understood that operations illustrated by way of example are not limited to judicial enforcement or off-chain data that originates or derives from a court or judicial process.

In accordance with example embodiments, each miner that was chosen to write a block for the blockchain may subsequently be selected, allocated, or assigned to perform honest retrieval from an off-chain source of off-chain data, and as condition for secure and authenticated retrieval, may receive an award or, more generally, a conveyance. In an example blockchain, the award or conveyance source may sometimes be referred to as a "coinbase." However, other forms of award or conveyance may be used. A miner may be chosen to write a block for the blockchain upon having successfully solved or "mined" the block. In accordance with example embodiments, being chosen or winning the right to write a block may thus be an indication to a miner that it has been allocated, selected, or assigned to perform a secure off-chain retrieval. In this sense, the indication may be considered as having been received by the miner, at least implicitly.

Retrieval may be repeated N times (where N is an integer) by N different miners such that the chances of a single entity or coalition controlling N miners (chosen serially) without gaining control of the blockchain network may effectively be zero. Any system for importing off-chain data that meets this requirement may be considered one for which the imported data is as trustworthy as the blockchain network itself.

The forgoing state may be defined by an equilibrium between the effort needed to compromise the retrieval process and the effort needed to compromise the blockchain network. Referred to herein as an "Equilibrium State" or "ES," it may be defined as: Effort needed to control data maliciously equals Effort needed to control blockchain network maliciously.

In the ES condition, adding off-chain data may not increase the attack surface of the blockchain network so there may be no added risk to any user. Further, in the ES condition, a malicious actor who has already sufficiently compromised a blockchain network can double spend or even create a malicious soft fork by overriding protocols or adding new ones to accomplish any transaction the malicious actor desires and then include them into the longest chain. In other words, the mischief that the malicious actor seeks to accomplish by falsifying the imported data can be accomplished by other means. Thus, any work employed to make an off-chain data retrieval process more secure than it already is by current protocols (e.g., requiring unanimity of the nodes) may be considered wasted because it exceeds the trustworthiness of the blockchain network itself.

Further, once a malicious actor controls the entire blockchain network, incentives change such that the best economic outcome for the actor will likely be to operate the blockchain network virtuously so as to maintain the value of the coins the malicious actor is earning.

The example judicial retrieval scenario described below illustrates just one of multiple possible methods for using ES to secure retrieval of off-chain data. Additional methods and/or extensions to the examples herein will be readily apparent to those skilled in the art.

In the example of judicial retrieval, for each retrieval, a miner may access a specified database (which could be another distributed ledger), look at a text-processed file (e.g., PDF file) from the docket entry, and find a hash of the entry. In the example of FIG. 3, the specified database may be the published enforcement actions server 308, and the docket entry may be the HASH plus enforcement action specification 305, where the hash of the entry is the HASH. In this retrieval example, the HASH may be referred to herein as a "first hash" or "Hash 1." The miner may then apply a hash function to the entry to generate a second hash, referred to herein as a "second hash" or "Hash 2." The miner may then write Hash 1 and Hash 2 to a database (which could be the network's decentralized ledger, another network's decentralized ledger, or a mempool). In accordance with example embodiments, the database to which the miner writes Hash 1 and Hash 2 may be a smart contract.

A blockchain network may have associated dynamic data storage, such as a queue, configured for holding data entries related to blockchain operations. Such a queue is commonly referred to as a "memory pool" or "mempool." In example operations, a mempool may hold entries corresponding to pending transactions. A blockchain node may access the mempool from time to time, thereby discovering transactions that need to be entered in a new block. If the entry representing such a transaction includes an appropriate form of authentication or verification, the node may then proceed with entering the transaction, otherwise, the node may decline to enter the transaction.

In the example of judicial retrieval, the mempool may include judicial transactions that are not initially verified. A judicial transaction may thus "sit" in the mempool unless and until N serially-signed entries have been written to a database or other storage location (which may include adding the signatures to the mempool transactions). In an example, the storage location may be a smart contract for the given docket entry. In accordance with example embodiments, a transaction in the mempool may be verified by an off-chain retrieval carried out by a threshold number of miners. In some examples, the threshold could be just one. However, a larger number N>1 may help ensure enhanced security, such as that afforded by the ES condition. Thus, a transaction in the mempool may only be approved if signatures 1 though N contain the same Hash 1 and Hash 2. If any one of the N entries disagrees with the others, the transaction may be rejected because there is insufficient basis to conclude that the malicious actor has achieved ES (in other words the malicious actor effectively controls the blockchain network).

In judicial retrieval, or similarly modeled retrieval, the off-chain data may correspond to data used by a miner or miners to authenticate or validate a transaction in the mempool. That is, each miner's digitally signed Hash 1+Hash 2 may be considered a secure verification that an associated transaction in the mempool may be picked up by a node and entered into a new block of the blockchain. By requiring a threshold number (e.g., N) of such verifications, the retrieval process is thereby made at least as secure as the underlying blockchain, because it uses the same consensus protocols that ensure validity of the blockchain.

In some usage scenarios, off-chain data may include target content instead of, or in addition to, a hash or other authentication of the off-chain data at the data source. In such usage scenarios, a miner performing secure retrieval may retrieve the actual target content and deliver it to the mempool (or other storage), possibly in addition any hash associated with the target content at the data source. The miner may then also provide a verification that it securely retrieved the target content. For example, the miner could apply a hash function to the target content at the off-chain data source, thereby generating a "source hash." The miner may similarly generate a "destination hash" of the target content from the delivered target content at the mempool. The miner could then digitally sign a verification that the source and target hashes are identical.

In accordance with example embodiments, each given miner's entitlement to the coinbase for solving a block, possibly as well as for having been selected for writing the solved block to the blockchain, may be made contingent on the given miner's participation in secure off-chain data retrieval. In particular, a blockchain network may maintain a retrieval-request queue of entries indicating off-chain data that needs to be retrieved. Upon solving a block and writing it to the blockchain, retrieval-based contingency of a coinbase award may incent a miner to examine the retrieval-request queue to determine if there are any outstanding requests. The miner may then be entitled to receive its coinbase conveyance upon demonstrating that it checked the queue, and if a request for off-chain retrieval was found, serviced the request according to one or more of the procedures described herein. The process of a miner checking the queue and retrieving data if a request found may be referred to as "allocating retrieval." In this sense, allocation may also be considered selection or assignment.

In further accordance with example embodiments, when off-chain data with verification that it was securely retrieved by a given miner is found in the mempool (or other database) by a node undertaking to write a new block for the blockchain, the node may include an entry associated with the verified off-chain data in the new block. In the example of a verified judicial action, the node my enter a transaction or other specified entry according to the verified judicial action. The node may also take the presence of the verified judicial action (or other form of verified off-chain data) in the mempool as confirmation that the miner node carried out the secure retrieval task, and is therefore entitled to the coinbase conveyance. The node may therefore enter a pending transaction for the conveyance in the mempool, which may subsequently be included in a future block. In this way, the miner node may receive its conveyance for both solving the block, having the block written, and thereafter performing secure retrieval. In the event that the miner node, having been allocated a secure retrieval, found nothing to retrieve in a queue of retrieval requests, the miner node may provide some other form of proof that it did check the queue, and thus is still entitled to the conveyance for having at least solved the block, and having been chosen to write the block. For example, the retrieval request queue may include a known null entry that can be retrieved by miners as proof of having checked the queue and found it empty. Other forms of proof may be used as well.

There may be practical engineering considerations with allocating the retrieval process to unknown miners. Miners may retrieve a docket entry (e.g., verification according to Hash 1 and Hash 2) as a condition of being award from the coinbase. However, in might happen that a miner may have an incentive to get its coinbase by falsely claiming that it checked the docket and that the docket entry did not exist, when in fact it did not check. Any miner that followed such actions might conceivably get its coinbase without a pending judicial transaction going through.

In one approach to avoiding this situation, miners could be penalized for disagreeing with the majority on Hash 1. However this could be unfair, as the reporting majority might be the compromised nodes. Alternatively, the miners might not be penalized for disagreeing on Hash 1, so they would still get the coinbase. However, miners may be denied their coinbase if: (1) they fail to sign a smart contract indicating their verification at all (i.e., did not participate); (2) agree with the majority on Hash 1 but disagree with the majority of N on Hash 2 (i.e., tried to fake a retrieval); or (3) claim there is no docket entry when the majority of N report that there is a docket entry and agree on Hash 2.

Additionally or alternatively, a miner that claims the docket entry is empty could be required to give proof that it checked the docket entry by returning a hash of the page that an electronic docket generates when that search returns no answer. In another example non-miner retriever or retrievers may check the docket to see if they find a docket entry and write the result to the smart contract or database. One probably suffices since there is nothing to gained by hacking it. If the non-miner retriever is hacked and falsely reports seeing the docket entry when there is none then (a) the honest miners do not get paid, and (b) the transaction does not go through—i.e., the malicious actor achieved nothing for itself. If the non-miner retriever is hacked and falsely reports not seeing the docket entry when there is an entry then (a) the honest miners do not get paid and (b) the transaction does not go through—i.e., the malicious actor again achieved nothing for itself.

Another step for insuring that the miner did the work may involve the controller generating a transaction and inserting a special public key. The special public key may be generated by going to a judicial interface, downloading a text-processed (e.g., PDF) document, hashing the entire document, then deriving the public key from the associated hash (i.e., the hash is the private key). The special public key may then be added to the transaction payload, and submitted to the node. The miner may download the text-processed document, hash it, and then sign the hash using the special private key. Each full node may then be able to verify that the miner signature matches, check that the public address of the signature matches coinbase, and that the signed content (private key—i.e. the hash of the text-processed document) is an asymmetric cryptography pair of the public key that's in the transaction payload.

B. Other Forms of Secure Off-Chain Retrieval

The example secure off-chain retrieval process illustrated above for the usage scenario of judicial docket retrieval case to the retrieval may be extended to any form of off-chain digital data. Examples of such extensions are discussed below.

Miner-Driven Oracle Function.

In the context of blockchain networks, an entity that conveys data from a source location to a destination location (which may include verifying the fidelity of the transfer, thereby ensuring that the source and destination copies of the data are identical and unchanged by the transfer) may be referred to as an "oracle." Example embodiments herein of miner-based secure off-chain retrieval may thus be considered a form of miner-driven oracle function. As described above, one aspect of the security afforded by this approach is the ES condition. Miner-driven oracle function is described in additional detail in the following.

Many decentralized networks may offer a feature of running computer code in a virtual machine or similar environment that is executed by the network nodes. These programs are sometimes referred to as smart contracts.

An important feature of smart contracts is their ability to alter their operation based on data inputs. For example, a smart contract may be written to escrow a digital asset posted as collateral for a debt. The contract could release the digital asset to the lender if the price of the asset falls to a certain predetermined level. Such a contract may use data about the trading price of the underlying asset to know if the condition for release to the lender has been satisfied.

Generally, the data used by smart contracts may be considered as falling into two categories: blockchain native and off-chain. The trading price of a digital asset is an example of blockchain native data, as the data can be derived from other trading taking place on the blockchain network. Off-chain data can be any other form of data that is not generated on the blockchain, such as weather data, GPS location data, the results of sporting events, elections, etc. For example, a smart contract may be written to escrow payment for a shipment of widgets until the shipping container arrives at port. Such a contract could need to know the GPS location of the container. However, the GPS data is not blockchain native and, therefore, should be brought on-chain.

One typical method for importing off-chain data is through an oracle, which may be considered a trusted source of the information. As described in general terms above, oracles may act conduits from a data source to a blockchain, gathering the data and then writing it to the chain. However, off-chain oracles may be susceptible to malicious actors. Therefore, the data may generally be bonded such that oracles stake assets and these can be partially or completely forfeited in the event the oracle supplies inaccurate information.

The secure off-chain retrieval process described above by way of example provides a new method of making off-chain data useable by decentralized networks. Network nodes can include software to allow them to directly access any off-chain data. For example, the nodes could be programed to directly access a database.

Once the nodes are able to access this information the network could make use of it in several ways. First, one or more nodes could retrieve the information and write it to the blockchain in similar fashion to the oracle. One advantage of using the blockchain network's nodes for this function instead of off-chain oracles is that the data can be secured using the ES condition instead of the staking and slashing method. Depending upon the needs, retrieval could require a unanimity of nodes or a plurality of nodes (including a single node) selected so as to ensure the reliability of the data against malicious actors, such as a random method, the ES condition, or other method.

In situations where speed is not necessarily a primary consideration, the blockchain network could use serial retrieval by the block-writing nodes, discussed above, to achieve ES. Alternatively, the blockchain network could use a random selection method to choose among nodes to retrieve the data. Depending upon the number of active nodes in the blockchain network agreement among relatively few nodes could demonstrate the ES condition to a high degree of certainty.

Direct Interaction with Off-Chain Data by Miners.

In an alternative approach, a node may use off-chain data as a direct input. For example, a condition could be specified for a given transaction such that confirmation of the transaction requires each node to directly check the off-chain data. In smart contracting blockchain platforms, the conditions can be added via the native programming language, while in others (such as Bitcoin), a scripting language could be added to require such a condition.

Such a method may be useful, inter alia, where there is no oracle service for the data (e.g., propriety, classified or other non-public data) or where a user does not wish to trust oracles. In an example usage scenario, a government database may be checked to confirm that a sending or receiving public key is not associated with a person or entity on a list of sanctioned otherwise controlled entities or sources (e.g., an Office of Foreign Assets Control list). In that case, each node may separately access the off-chain data source as part of the transaction confirmation process.

Another example use could be an ability to access a database about the status of the blockchain network itself (e.g., a Network Status Database, such as that discussed below). Any useful data could be included, such as the number of nodes awake, their respective IP addresses, their respective public keys, the IP addresses of the nodes to which they are then connected, the public key of each node that solves a block as it solves the block, the transactions that a block-solving node has chosen to include in that block, which nodes have accepted that block, etc. Such a database could be constructed by nodes self-reporting the data and would in-turn be accessible by each node.

A Network Status Database could allow the nodes in a decentralized network to directly observe the present state of the network itself. Access to such data could provide a host of advantages such as dynamically altering the consensus method to optimize among trade-offs and informing system users of valuable data with which to assess transaction certainty and finality.

Additionally, the existence of such a database could allow use of a serial observation method of achieving ES without requiring the block-writing nodes to write the retrieved data to a smart contract. Rather, block-writing nodes could serially sign a transaction formulated as a multi-signature transaction. Confirmation of the signatures could be accomplished by reference to the Network Status Database to check that the signature is from nodes that serially reported solving a block.

VI. BLOCKCHAIN NETWORK STATUS DATABASE

Example operations for secure retrieval of off-chain data described above may involve blockchain nodes and/or miner both sending and receiving data off chain. These activities, as well as others carried out by network nodes in support of a blockchain, may be viewed as providing a sort of snapshot of the state of the blockchain. Accordingly, a Blockchain Network Status Database may be constructed for recording node activity, as well as other information about a blockchain that may enable any node authorized to access and/or view the Network Status Database to obtain useful (and possibly vital) information about the blockchain, and to adjust or adapt its operations in relation to the blockchain.

In accordance with example embodiments, a Blockchain Network Status Database may thus be configured for enabling nodes to report information about their activity. In further accordance with example embodiments, the Blockchain Network Status Database may be configured for also enabling nodes to access the database to obtain useful information about the present status of the blockchain network.

Conventional blockchain consensus protocols offer competing methods for creating a shared view of truth, while protecting that shared view from malicious actors. Each protocol attempts to optimize for a given set of circumstances and, in doing so, makes tradeoffs.

For example, under Nakamoto-type Longest Chain Consensus (LCC), the network can operate under conditions of low participation (e.g., nodes can come and go and so are not always online). A ledger maintained in a blockchain may be considered safe from malicious actors so long as fewer than 50% of the nodes participating at any given time are malicious. When additional nodes come online they join the longest chain and accept the view of truth that has been created by the majority of active nodes in their absence.

A trade-off for LCC is that settlement is only probabilistic. Transactions lack finality because the network may temporarily partition into one or more separate branches. A transaction could be accepted by the parties to it before that partition was resolved by a majority of nodes perceiving a longest chain. Transactions on the rejected chain could become invalid.

Advantageously, a Blockchain Network Status Database could be configured to track which nodes have accepted which blocks and which transactions. Thus a blockchain network user could understand in real time whether a network partition has formed and, if so, the status of that user's transaction. In this way, a node that becomes active—e.g., comes online—following a period of inactivity may consult the Blockchain Network Status Database and thereby obtain a current status of the blockchain, as well as a record of activity that occurred during the node's absences (inactivity period).

Similarly, the blockchain network nodes could understand in real time how many other nodes are awake, whether a partition has formed, and where they are in it. This may allow the nodes to optimize block acceptance and achieve consensus more quickly.

Further, with a real time record of awake nodes, tasks can be allocated among nodes in ways that would not otherwise be impossible. For example, considering again the judicial docket retrieval usage scenario, a random selection procedure could be used to assign to awake nodes a task of retrieving a block. This could thus be an alternative serial observation by nodes that won the block. Practical certainty about the ES state could thus be reached far more quickly than by awaiting serial block production to choose the retrieving node.

In accordance with example embodiments, a server hosting or associated with a Blockchain Network Status Database may be configured to make a random selection among nodes reporting awakeness, as determined from the Status Database, and thereby assign retrieval tasks via on-chain or off-chain messaging. Alternatively, a protocol could include a random selection method based on information reported by the Status Database. Further, other awake nodes could query the database to determine which nodes were randomly selected and their public keys to ensure that a judicial transaction within the mempool (or judicial docket retrieval reported to a database) has been properly signed.

In further accordance with example embodiments, a Blockchain Network Status Database may be used for recording activity of miners' performance of secure off-chain retrievals. For example, a miner's proof of having carried out a secure off-chain retrieval following allocation or assignment of the miner of the retrieval task may be recorded in the Status Database. By checking the Status Database for such proof, a node may thereby verify that the miner is entitled to its conveyance.

In some embodiments, a Blockchain Network Status Database may be implemented as an off-chain data source, and the records of the Status Database may be considered off-chain data. In such embodiments, read and/or write access by nodes to the Blockchain Network Status Database may be mediated or moderated by a secure off-chain retrieval procedure, such as the miner-based retrieval method describe above. For example, a node may obtain a record from the Status Database by entering a request for secure retrieval of the record in a retrieval request queue, and thereafter wait for the record to be securely retrieved by a miner and placed in the mempool or other blockchain network storage location directly accessible to the node. Similarly, a node may write a record to the Status Database by entering the record in an accessible blockchain storage location, such as the mempool, that may be checked by miners allocated to perform a secure write to the Status Database. Thereafter, a miner may pick up the record and securely deliver and write it to the Status Database, following a procedure largely the inverse of the secure retrieval procedure described above. In this way, the Status Database may be made secure by virtue of read and/or write operations being allocated to miners of a blockchain network.

In accordance with example embodiments, a Blockchain Network Status Database may be configured to be a reliable source of truth. This may help ensure that the Status Database can be used dynamically. Two aspects may ensure the requisite reliability. A first aspect is implementing the database in a manner that makes it secure from malicious actors. Security can avoid and/or mitigate circumstances in which data used by nodes to adjust their consensus assumptions may be vulnerable or exposed to malicious corruption that might otherwise be used to manipulate the consensus process. An example would be to have the Status Database operate as its own distributed network.

As a second, the nodes may be configured to reliably report their view of the state of the blockchain network. For example, each node could notify the database when it comes online but would also provide continuous proof of awakeness. This could avoid unreliability of assuming nodes remain online until they report going offline. In accordance with example embodiments, nodes may be required and/or configured to periodically report reconfirmation of awakeness. Such a proof method may include a procedure for preventing spoofing. For example, nodes may be required and/or configured to report the present state of a rapidly changing but mutually viewable fact, such as a random number generated and posted to a mutually accessible site.

VII. EXAMPLE METHODS

A. Example System-Level Methods

Figure 9:
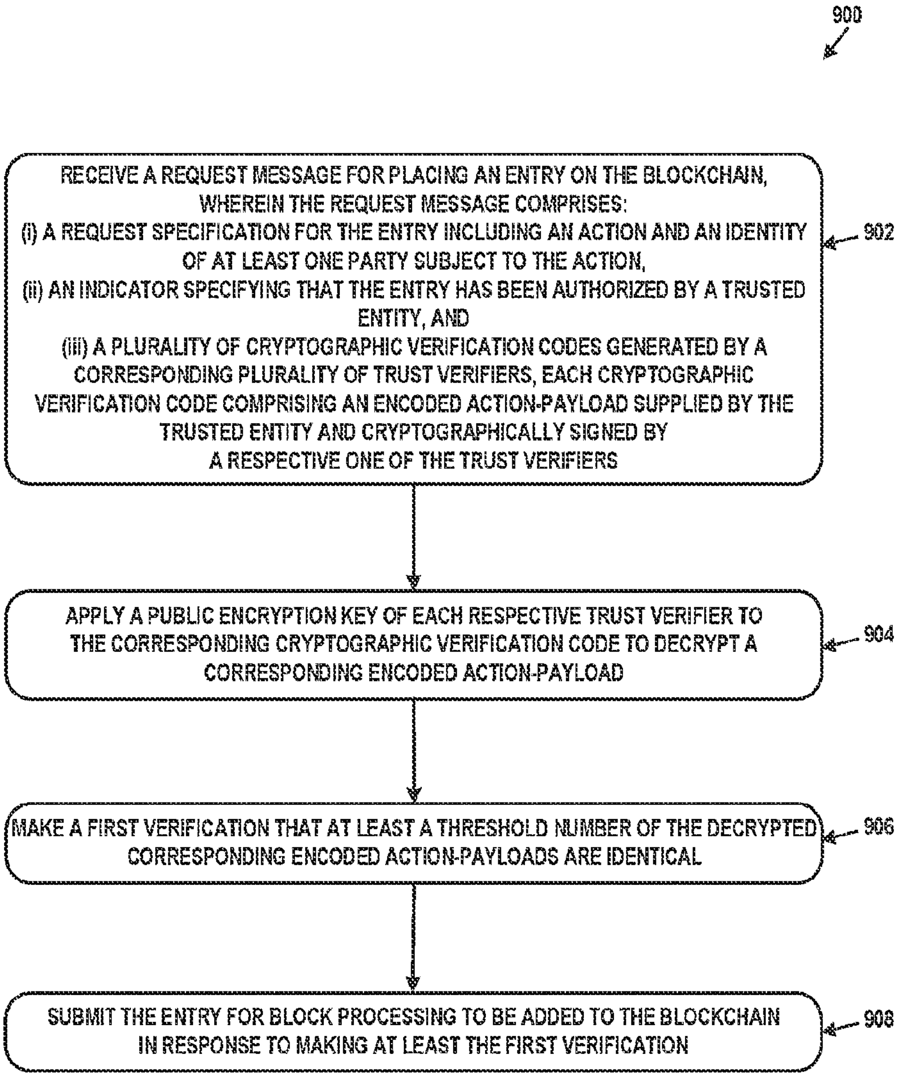
FIG. 9 illustrates a flow chart of an example system-level method for transactions, in accordance with example embodiments.
Figure 10:
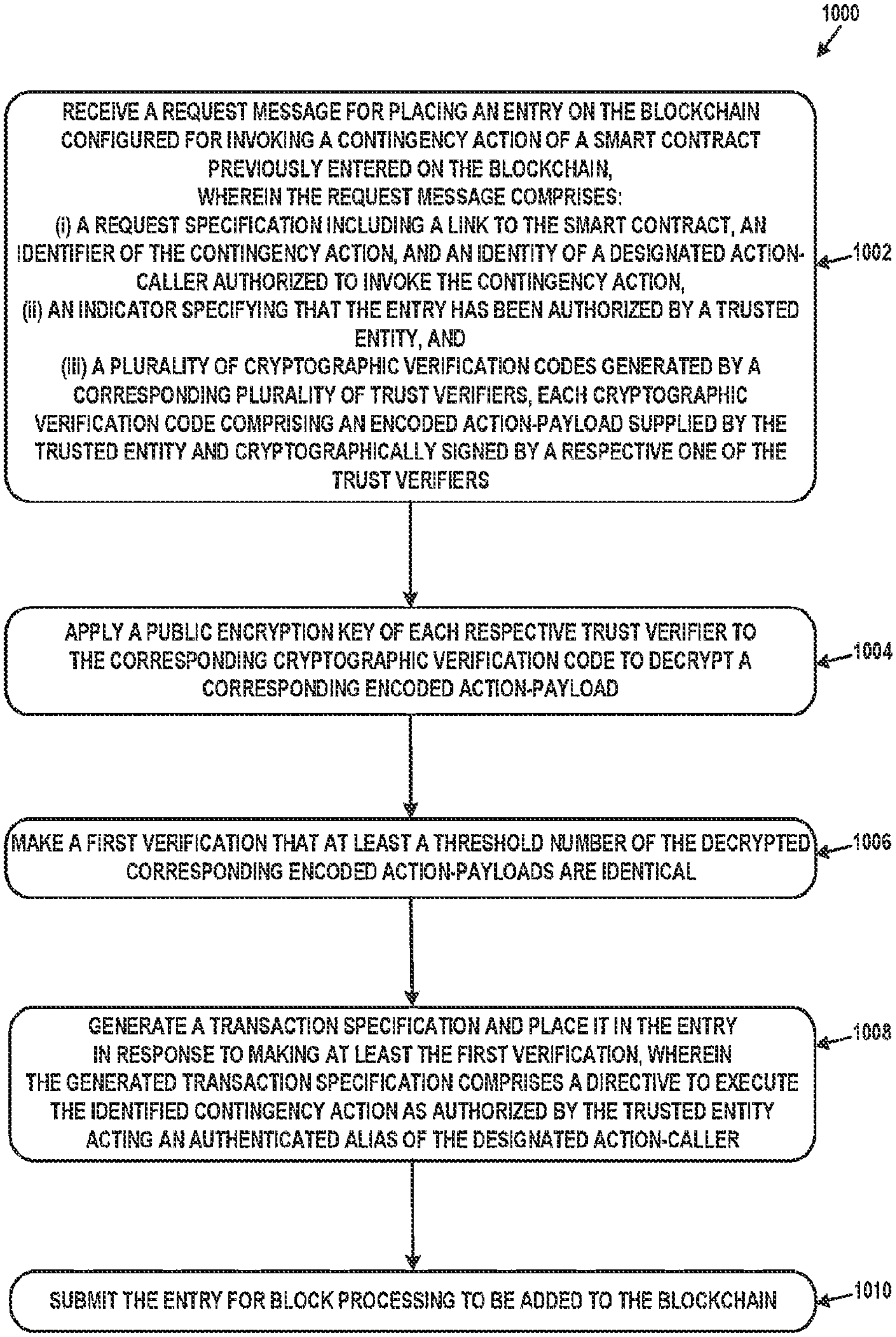
FIG. 10 illustrates a flow chart of an example system-level method for smart contracts, in accordance with example embodiment.

FIGS. 9 and 10 are flow charts illustrating a respective example methods 900 and 1000 of an example system-level embodiment. The methods illustrated by FIGS. 9 and 10 may both be carried out by a computing system or computing device configured for operating as a node of a network of nodes operating a blockchain. Non-limiting examples of the computing system computing system or computing device include computing device 100 or server cluster 204, for example. However, the method can be carried out by other types of devices or device subsystems. For example, the process could be carried out by a portable computer, such as a laptop or a tablet device.

The embodiments of FIGS. 900 and 1000 may be simplified by the removal of any one or more of the features shown therein. Further, these embodiments may be combined with features, aspects, and/or implementations of any of the previous figures or otherwise described herein.

The example methods 900 and 1000 may also be embodied as instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

Example method 900, directed to a transaction scenario of a system-level embodiment, is described first.

Block 902 of example method 900 may involve receiving a request message for placing an entry on the blockchain. The request message could be received at the UI 304-I/F, for example. The request message may include (i) a request specification for the entry including an action and an identity of at least one party subject to the action, (ii) an indicator specifying that the entry has been authorized by a trusted entity, and (iii) a plurality of cryptographic verification codes generated by a corresponding plurality of trust verifiers. Each cryptographic verification code may include an encoded action-payload supplied by the trusted entity and cryptographically signed by a respective one of the trust verifiers. In some examples, an actual identity of the at least one party may not be known. Instead, some other form of link to the party may be available, such as an address, or a cryptographic key, for example. These may be used in place of an actual identity.

Block 904 of example method 900 may involve applying a public encryption key of each respective trust verifier to the corresponding cryptographic verification code to decrypt a corresponding encoded action-payload.

Block 906 of example method 900 may involve making a first verification that at least a threshold number of the decrypted corresponding encoded action-payloads are identical.

Finally, block 908 of example method 900 may involve submitting the entry for block processing to be added to the blockchain in response to making at least the first verification.

In accordance with example embodiments, example method 900 may further involve applying a payload-encoder function to the request specification to derive a local version of the encoded action-payload, and then making a second verification that the local version of the encoded action-payload is identical to that of each of the at least the threshold number of decrypted corresponding encoded action-payloads that are identical. In this arrangement, submitting the entry for block processing may entail submitting the entry for block processing to be added to the blockchain in response to making both the first verification and the second verification.

In accordance with example embodiments, the threshold number may be the total number of the plurality, a majority of the total number of the plurality, or an integer number closest to a specified fraction of the total number of the plurality.

In accordance with example embodiments, making the first verification that at least the threshold number of the decrypted corresponding encoded action-payloads are identical may entail making a selection of a predetermined number of the decrypted corresponding encoded action-payloads to compare. Further, the threshold number may equal predetermined number. With this arrangement, the selection may be one of random, and/or based on prescribed identities of particular ones of the corresponding plurality of trust verifiers.

In accordance with example embodiments, the encoded action-payload supplied by the trusted entity may be a hash, and the payload-encoder function may be a hash function. In this arrangement, each corresponding encoded action-payload may be a corresponding hash value, and the local version of the encoded action-payload may be a local hash value. Further in this arrangement, making the first verification that the at least the threshold number of the decrypted corresponding encoded action-payloads are identical may involve verifying that at least the threshold number of the corresponding hash values are identical, and making the second verification that the local version of the encoded action-payload is identical to that of each of the at least the threshold number of decrypted corresponding encoded action-payloads that are identical may involve verifying that the local hash value is identical to that of the at least the threshold number of the corresponding hash values that are identical.

In accordance with example embodiments, the encoded action-payload supplied by the trusted entity may include a semantic representation of the request specification created by the trusted entity and interpretable by a computing device.

In accordance with example embodiments, the encoded action-payload supplied by the trusted entity may include a semantic representation of the request specification generated by an artificial intelligence engine based on a natural-language description of the request specification, and interpretable by a computing device.

In accordance with example embodiments, submitting the entry for block processing to be added to the blockchain may involve including the entry in a candidate block that is input to a mining procedure.

In accordance with example embodiments, the at least one party may be associated with particular digital assets recorded in the blockchain. The action may be: transferring a specified amount of the particular digital assets from the at least one party to another party associated with the blockchain; freezing a specified amount of the particular digital assets; unfreezing a specified amount of the particular digital assets; transferring a specified amount of the particular digital assets from the at least one party to an escrow account associated with the blockchain; and/or transferring a specified amount of the particular digital assets from the at least one party to particular account associated with the blockchain.

In accordance with example embodiments, execution of the action may be delayed by a specified amount time from a specified date and time, or scheduled for a particular date and time.

Example method 1000, directed to a smart contract scenario of a system-level embodiment, is described next.

Block 1002 of example method 1000 may involve receiving a request message for placing an entry on the blockchain configured for invoking a contingency action of a smart contract previously entered on the blockchain. The request message could be received at the UI 304-I/F, for example. The request message may include (i) a request specification including a link to the smart contract, an identifier of the contingency action, and an identity of a designated action-caller authorized to invoke the contingency action, (ii) an indicator specifying that the entry has been authorized by a trusted entity, and (iii) a plurality of cryptographic verification codes generated by a corresponding plurality of trust verifiers. Each cryptographic verification code may include an encoded action-payload supplied by the trusted entity and cryptographically signed by a respective one of the trust verifiers. Non-limiting examples to a link to a smart contract include an address (e.g., a URL) to location, a pointer to a database entry, and an address on a blockchain. In some examples, an actual identity of the designated action-caller may not be known. Instead, some other form of link to the designated action-caller may be available, such as an address, or a cryptographic key, for example. These may be used in place of an actual identity. In some examples, the identity of the designated action-caller may be omitted.

Block 1004 of example method 1000 may involve applying a public encryption key of each respective trust verifier to the corresponding cryptographic verification code to decrypt a corresponding encoded action-payload.

Block 1006 of example method 1000 may involve making a first verification that at least a threshold number of the decrypted corresponding encoded action-payloads are identical.

Block 1008 of example method 1000 may involve generating a transaction specification and placing it in the entry in response to making at least the first verification. The generated transaction specification may then include a directive to execute the identified contingency action as authorized by the trusted entity acting an authenticated alias of the designated action-caller.

Finally, block 1010 of example method 1000 may involve submitting the entry for block processing to be added to the blockchain.

In accordance with example embodiments, example method 1000 may further involve applying a payload-encoder function to the request specification to derive a local version of the encoded action-payload, and then making a second verification that the local version of the encoded action-payload is identical to that of each of the at least the threshold number of decrypted corresponding encoded action-payloads that are identical. In this arrangement, generating the transaction specification and placing it in the entry may entail generating the transaction specification and placing it in the entry in response to making both the first verification and the second verification.

In accordance with example embodiments, example method 1000 may further involve causing the identified contingency action of the smart contract previously entered on the blockchain to execute.

In accordance with example embodiments, the request specification may further include one or more parameters of the identified contingency action.

In accordance with example embodiments, the threshold number may be the total number of the plurality, a majority of the total number of the plurality, or an integer number closest to a specified fraction of the total number of the plurality.

In accordance with example embodiments, making the first verification that at least the threshold number of the decrypted corresponding encoded action-payloads are identical may entail making a selection of a predetermined number of the decrypted corresponding encoded action-payloads to compare. Further, the threshold number may equal predetermined number. With this arrangement, the selection may be one of random, and/or based on prescribed identities of particular ones of the corresponding plurality of trust verifiers.

In accordance with example embodiments, the encoded action-payload supplied by the trusted entity may be a hash, and the payload-encoder function may be a hash function. In this arrangement, each corresponding encoded action-payload may be a corresponding hash value, and the local version of the encoded action-payload may be a local hash value. Further in this arrangement, making the first verification that the at least the threshold number of the decrypted corresponding encoded action-payloads are identical may involve verifying that at least the threshold number of the corresponding hash values are identical, and making the second verification that the local version of the encoded action-payload is identical to that of each of the at least the threshold number of decrypted corresponding encoded action-payloads that are identical may involve verifying that the local hash value is identical to that of the at least the threshold number of the corresponding hash values that are identical.

In accordance with example embodiments, the encoded action-payload supplied by the trusted entity may include a semantic representation of the request specification created by the trusted entity and interpretable by a computing device.

In accordance with example embodiments, the encoded action-payload supplied by the trusted entity may include a semantic representation of the request specification generated by an artificial intelligence engine based on a natural-language description of the request specification, and interpretable by a computing device.

In accordance with example embodiments, submitting the entry for block processing to be added to the blockchain may involve including the entry in a candidate block that is input to a mining procedure.

In accordance with example embodiments, causing the identified contingency action of the smart contract previously entered on the blockchain to execute may entail causing execution to be delayed by a specified amount time from a specified date and time, or scheduled for a particular date and time.

B. Example Entry-Level Methods

Figure 11:
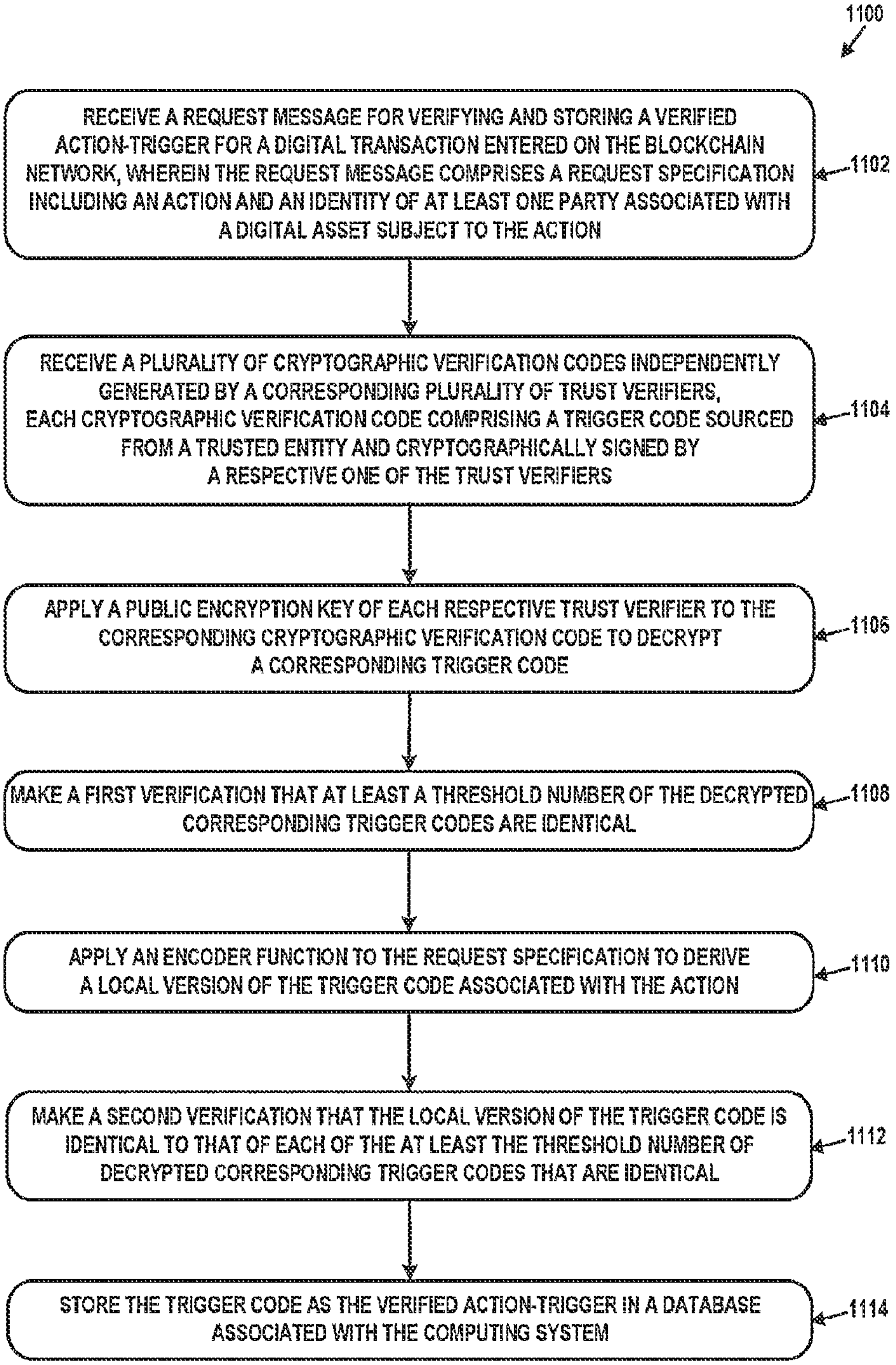
FIG. 11 illustrates a flow chart of an example entry-level method for transactions, in accordance with example embodiments.
Figure 12:
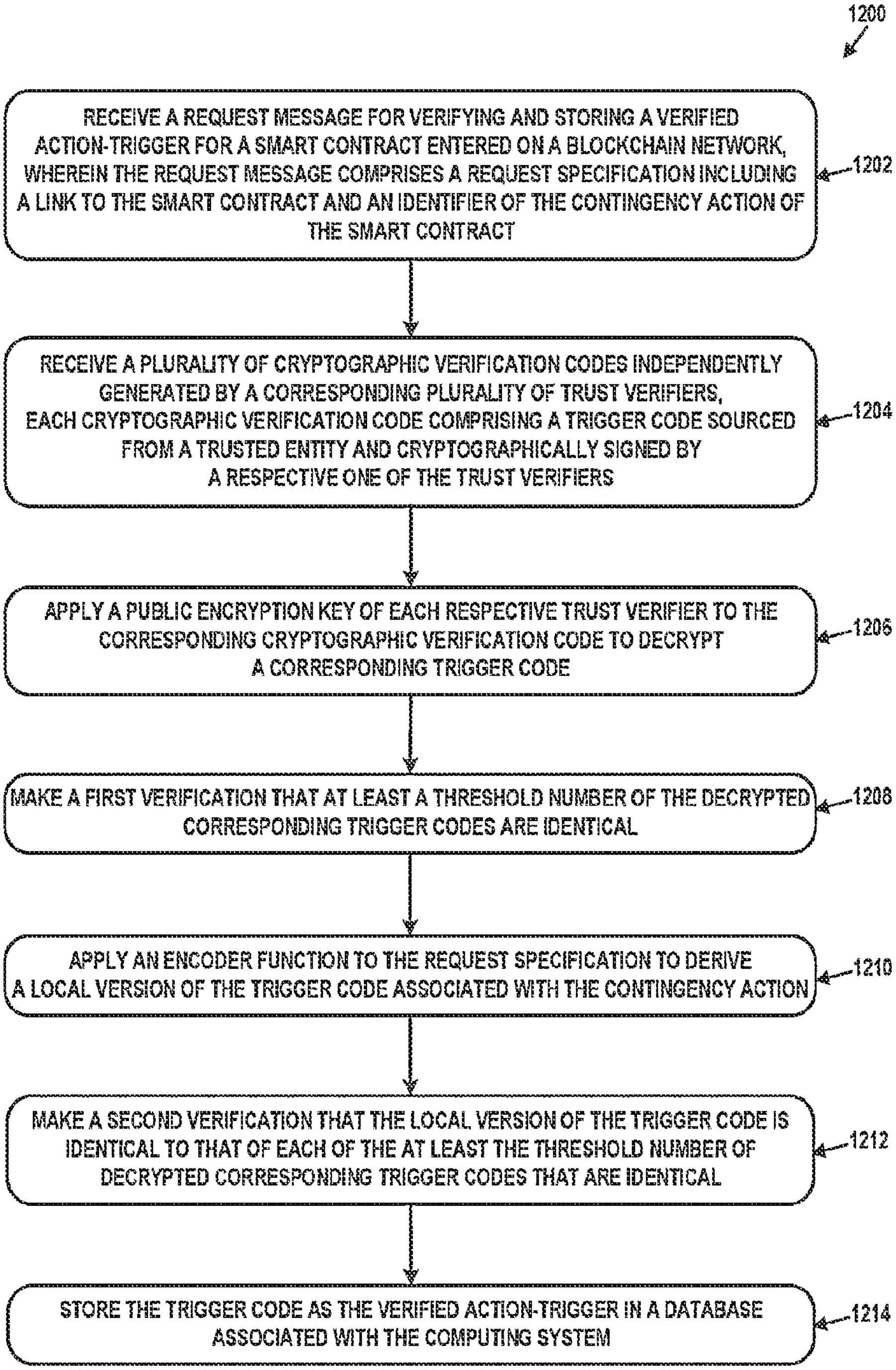
FIG. 12 illustrates a flow chart of an example entry-level method for smart contracts, in accordance with example embodiment.

FIGS. 11 and 12 are flow charts illustrating a respective example embodiments of a methods 1100 and 1200 of an example entry-level embodiment. The methods illustrated by FIGS. 11 and 12 may both be carried out by a computing system or computing device configured for operating as database server for verifying and storing encoded action-triggers for digital assets entered on a blockchain network. Non-limiting examples of the computing system computing system or computing device include computing device 100 or server cluster 104, for example. However, the method can be carried out by other types of devices or device subsystems. For example, the process could be carried out by a portable computer, such as a laptop or a tablet device.

The embodiments of FIGS. 1100 and 1200 may be simplified by the removal of any one or more of the features shown therein. Further, these embodiments may be combined with features, aspects, and/or implementations of any of the previous figures or otherwise described herein.

The example methods 1100 and 1200 may also be embodied as instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

Example method 1100, directed to a transaction scenario of an entry-level embodiment, is described first.

Block 1102 of example method 1100 may involve receiving a request message for verifying and storing a verified action-trigger for a digital transaction entered on the blockchain network. The request may include the request message comprises a request specification including an action and an identity of at least one party associated with a digital asset subject to the action. Non-limiting examples to a link to a smart contract include an address (e.g., a URL) to location, a pointer to a database entry, and an address on a blockchain. In some examples, an actual identity of the at least one party may not be known. Instead, some other form of link to the party may be available, such as an address, or a cryptographic key, for example. These may be used in place of an actual identity.

Block 1104 of example method 1100 may involve receiving a plurality of cryptographic verification codes independently generated by a corresponding plurality of trust verifiers. Each cryptographic verification code may include a trigger code sourced from a trusted entity and cryptographically signed by a respective one of the trust verifiers.

Block 1106 of example method 1100 may involve applying a public encryption key of each respective trust verifier to the corresponding cryptographic verification code to decrypt a corresponding trigger code.

Block 1108 of example method 1100 may involve making a first verification that at least a threshold number of the decrypted corresponding trigger codes are identical.

Block 1110 of example method 1100 may involve applying an encoder function to the request specification to derive a local version of the trigger code associated with the action.

Block 1112 of example method 1100 may involve making a second verification that the local version of the trigger code is identical to that of each of the at least the threshold number of decrypted corresponding trigger codes that are identical.

Finally, block 1114 of example method 1100 may involve storing the trigger code as the verified action-trigger in a database associated with the computing system.

In accordance with example embodiments, the threshold number may be the total number of the plurality, a majority of the total number of the plurality, or an integer number closest to a specified fraction of the total number of the plurality.

In accordance with example embodiments, making the first verification that at least the threshold number of the decrypted corresponding encoded action-payloads are identical may entail making a selection of a predetermined number of the decrypted corresponding encoded action-payloads to compare. Further, the threshold number may equal predetermined number. With this arrangement, the selection may be one of random, and/or based on prescribed identities of particular ones of the corresponding plurality of trust verifiers.

In accordance with example embodiments, the trigger code supplied by the trusted entity may be a hash, and the encoder function may be a hash function. In this arrangement, each corresponding trigger code may be a corresponding hash value, and the local version of the trigger code may be a local hash value. Further in this arrangement, making the first verification that the at least the threshold number of the decrypted corresponding trigger codes are identical may involve verifying that at least the threshold number of the corresponding hash values are identical, and making the second verification that the local version of the trigger code is identical to that of each of the at least the threshold number of decrypted corresponding trigger codes that are identical may involve verifying that the local hash value is identical to that of the at least the threshold number of the corresponding hash values that are identical.

In accordance with example embodiments, the trigger code supplied by the trusted entity may include a semantic representation of the request specification created by the trusted entity and interpretable by a computing device.

In accordance with example embodiments, the trigger code supplied by the trusted entity may include a semantic representation of the request specification generated by an artificial intelligence engine based on a natural-language description of the request specification, and interpretable by a computing device.

In accordance with example embodiments, the at least one party may be associated with particular digital assets recorded in the blockchain. The action may be: transferring a specified amount of the digital asset from the at least one party to another party associated with the blockchain; freezing a specified amount of the digital asset; unfreezing a specified amount of the digital asset; transferring a specified amount of the digital asset from the at least one party to an escrow account associated with the blockchain; and/or transferring a specified amount of the digital asset from the at least one party to particular account associated with the blockchain.

In accordance with example embodiments, execution of the action may be delayed by a specified amount time from a specified date and time, or scheduled for a particular date and time.

In accordance with example embodiments, example method 1100 may further involve sending a copy of the verified trigger code to the node device in response to receiving a request from a node device of the blockchain network.

Example method 1200, directed to a smart contract scenario of an entry-level embodiment, is described next.

Block 1202 of example method 1200 may involve receiving a request message for verifying and storing a verified action-trigger for a smart contract entered on a blockchain network. The request message may include a request specification including a link to the smart contract and an identifier of the contingency action of the smart contract. Non-limiting examples to a link to a smart contract include an address (e.g., a URL) to location, a pointer to a database entry, and an address on a blockchain.

Block 1204 of example method 1200 may involve receiving a plurality of cryptographic verification codes independently generated by a corresponding plurality of trust verifiers. Each cryptographic verification code may include a trigger code sourced from a trusted entity and cryptographically signed by a respective one of the trust verifiers.

Block 1206 of example method 1200 may involve applying a public encryption key of each respective trust verifier to the corresponding cryptographic verification code to decrypt a corresponding trigger code.

Block 1208 of example method 1200 may involve making a first verification that at least a threshold number of the decrypted corresponding trigger codes are identical.

Block 1210 of example method 1200 may involve applying an encoder function to the request specification to derive a local version of the trigger code associated with the contingency action.

Block 1212 of example method 1200 may involve making a second verification that the local version of the trigger code is identical to that of each of the at least the threshold number of decrypted corresponding trigger codes that are identical.

Finally, block 1214 of example method 1200 may involve storing the trigger code as the verified action-trigger in a database associated with the computing system.

In accordance with example embodiments, the threshold number may be the total number of the plurality, a majority of the total number of the plurality, or an integer number closest to a specified fraction of the total number of the plurality.

In accordance with example embodiments, making the first verification that at least the threshold number of the decrypted corresponding encoded action-payloads are identical may entail making a selection of a predetermined number of the decrypted corresponding encoded action-payloads to compare. Further, the threshold number may equal predetermined number. With this arrangement, the selection may be one of random, and/or based on prescribed identities of particular ones of the corresponding plurality of trust verifiers.

In accordance with example embodiments, the trigger code supplied by the trusted entity may be a hash, and the encoder function may be a hash function. In this arrangement, each corresponding trigger code may be a corresponding hash value, and the local version of the trigger code may be a local hash value. Further in this arrangement, making the first verification that the at least the threshold number of the decrypted corresponding trigger codes are identical may involve verifying that at least the threshold number of the corresponding hash values are identical, and making the second verification that the local version of the trigger code is identical to that of each of the at least the threshold number of decrypted corresponding trigger codes that are identical may involve verifying that the local hash value is identical to that of the at least the threshold number of the corresponding hash values that are identical.

In accordance with example embodiments, the trigger code supplied by the trusted entity may include a semantic representation of the request specification created by the trusted entity and interpretable by a computing device.

In accordance with example embodiments, the trigger code supplied by the trusted entity may include a semantic representation of the request specification generated by an artificial intelligence engine based on a natural-language description of the request specification, and interpretable by a computing device.

In accordance with example embodiments, execution of the action may be delayed by a specified amount time from a specified date and time, or scheduled for a particular date and time.

In accordance with example embodiments, example method 1100 may further involve sending a copy of the verified trigger code to the node device in response to receiving a request from a node device of the blockchain network.

C. Example Secure Off-Chain Data Retrieval Method

Figure 13:
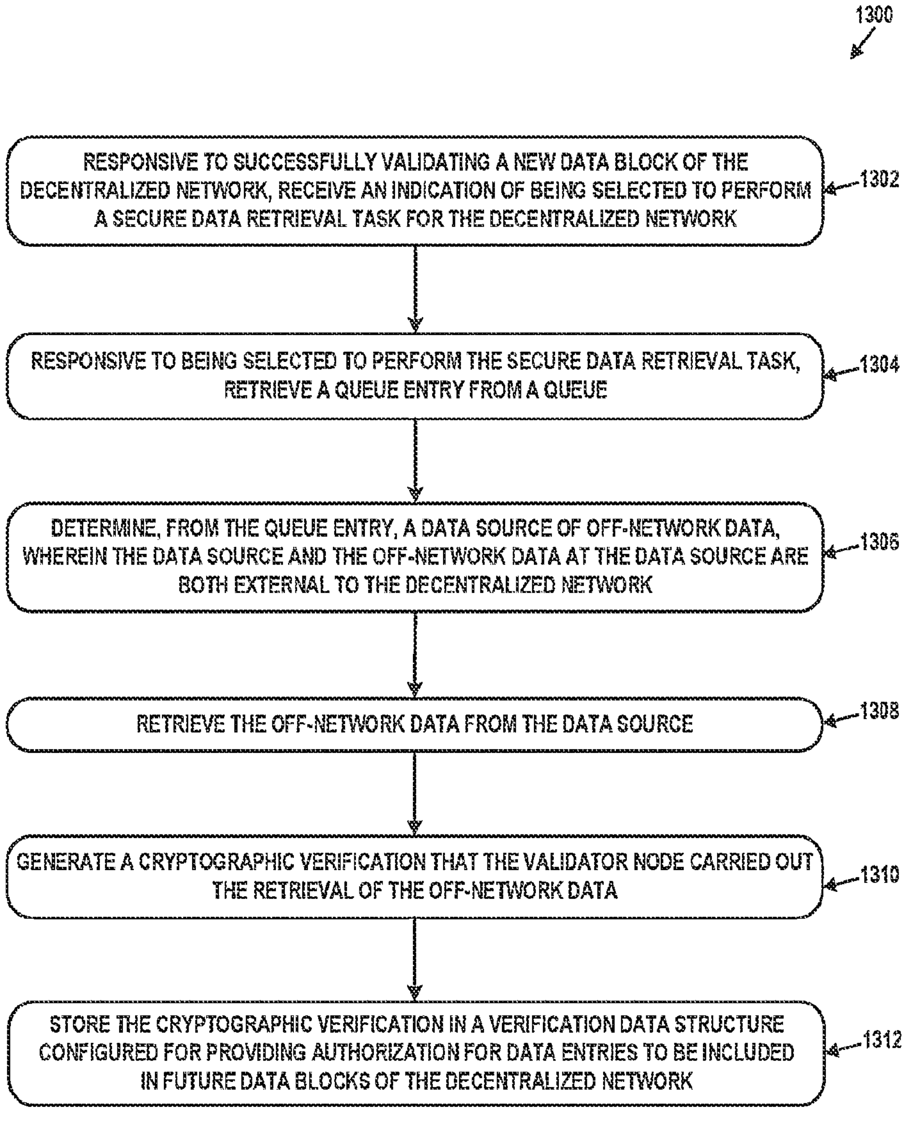
FIG. 13 illustrates a flow chart of an example method for secure retrieval of off-chain data, in accordance with example embodiments.

FIG. 13 is flow charts illustrating an example method 1300 of secure off-chain data retrieval, in accordance with example embodiments. The method illustrated by FIG. 13 may be carried out by a computing system or computing device configured for operating as a validator node of a network of nodes operating a decentralized network. In example embodiments, a decentralized network could be a blockchain, and a validator node could be a miner node. Non-limiting examples of the computing system computing system or computing device include computing device 100 or server cluster 204, for example. However, the method can be carried out by other types of devices or device subsystems. For example, the process could be carried out by a portable computer, such as a laptop or a tablet device.

Block 1302 of example method 1300 may involve the validator node, responsive to successfully validating a new data block of the decentralized network, receiving an indication of being selected to perform a secure data retrieval task for the decentralized network. In an example, the indication may be considered the validator node having successfully validated the block. In accordance with example embodiments, the decentralized network may be a blockchain, the data blocks of the of the decentralized network may be blocks of the blockchain, the validator node may be a miner node, and the off-network data may be off-chain data.

Block 1304 of example method 1300 may involve the validator node, responsive to being selected to perform the secure data retrieval task, retrieving, from a queue, a queue entry.

Block 1306 of example method 1300 may involve the validator node determining, from the queue entry, a data source of off-network data, wherein the data source and the off-network data at the data source are both external to the decentralized network.

Block 1308 of example method 1300 may involve the validator node retrieving the off-network data from the data source.

Block 1310 of example method 1300 may involve the validator node generating a cryptographic verification that the validator node carried out the retrieval of the off-network data.

Finally, block 1312 of example method 1300 may involve the validator node storing the cryptographic verification in a verification data structure configured for providing authorization for data entries to be included in future data blocks of the decentralized network.

In accordance with example embodiments, example method 1300 may further involve the validator node receiving conveyance data indicating assignment of a conveyance to the validator node for having retrieved, verified, and stored the off-network data. In some examples, the conveyance may be an award, such as a monetary award from a coinbase or other source.

In accordance with example embodiments, assignment of the conveyance to the validator node may be contingent upon the validator node having retrieved, verified, and stored the off-network data.

In accordance with example embodiments, the queue is at least one of: (i) a data-entry pool in the network of nodes that comprises pending data entries awaiting inclusion in data blocks of the decentralized network, and/or (ii) a data queue implemented externally to the network of nodes.

In accordance with example embodiments, the queue may include an indication that the off-network data is or includes target content to be retrieved from the data source. In this case, retrieving the off-network data from the data source may involve retrieving the target content from the data source, and generating the cryptographic verification may involve verifying that the validator node retrieved the target content from the data source.

In accordance with example embodiments, example method 1300 may further involve storing the retrieved target content in a data-entry pool of pending data entries awaiting inclusion in data blocks of the decentralized network. A non-limiting example of a data-entry pool is a mempool of a blockchain network.

In accordance with example embodiments, the network of nodes may include a data-entry pool of pending data entries awaiting inclusion in data blocks of the decentralized network, and the data source may be external to the network of nodes. In this case, the queue entry may include an indication that the off-network data is or includes target content that has already been delivered to the data-entry pool from data source. Again, a non-limiting example of a data-entry pool is a mempool of a blockchain network.

In accordance with example embodiments, retrieving the off-network data from the data source may involve determining that a destination hash value associated with the target content in the data-entry pool agrees with a source hash value associated with the target content at the data source. Further, generating the cryptographic verification may involve verifying that the validator node confirmed that the source and destination hash values are the same.

In further accordance with example embodiments, determining that the destination hash value associated with the target content in the data-entry pool agrees with the source hash value associated with the target content at the data source may involve applying a hash function to the target content at the source to derive the source hash value, and applying a hash function to the target content in the data-entry pool to derive the destination hash value. Then the derived source hash value may be compared with the derived destination hash value.

In accordance with example embodiments, retrieving the off-network data from the data source may involve retrieving from the data source a first hash value associated with the target content at the data source, and generating the cryptographic verification may involve applying a hash function to the target content in the data-entry pool to derive a second hash value. Storing the cryptographic verification in the verification data structure may then involve storing the first hash together with the second hash in the verification data structure.

In accordance with example embodiments, the verification data structure may be or include a smart contract.

In accordance with example embodiments, example method 1300 may be extend to one or more additional validator nodes. Thus, example method 1300 may further involve each of one or more additional validator nodes of the network of nodes, responsive to successfully validating the new data block of the decentralized network, receiving a respective indication of being selected to perform a respective secure data retrieval task for the network. Additional operations may include: each of one or more additional validator nodes, responsive to being respectively selected to perform the secure data retrieval task, retrieving, from the queue, the queue entry, and each of the one or more additional validator nodes determining, from the queue entry, the data source of the off-network data. Still further operations may include: each of the one or more additional validator nodes respectively retrieving the off-network data from the data source, each respective validator node of the one or more additional validator nodes generating a respective cryptographic verification that the respective validator node carried out the retrieval of the off-network data, and each of the one or more additional validator nodes respectively storing the cryptographic verification in the verification data structure.

In accordance with example embodiments, example method 1300 may further involve making a determination that a threshold number of the validator node and the one or more additional validator nodes have generated the same cryptographic verification, and responsive to the determination, causing one copy of the retrieved off-network data to be included in a subsequent new data block of the decentralized network.

In accordance with example embodiments, the data source may be a status database comprising status records written to the status database by each of one or more respective nodes of the decentralized network. Each status record may information indicative of the respective node's activity on the network. In this case, retrieving the off-network data from the data source may involve retrieving one or more of the status records from the status database, and delivering the one or more retrieved status records directly or indirectly to at least one of the nodes of the network.

D. Example Network Status Database Method

Figure 14:
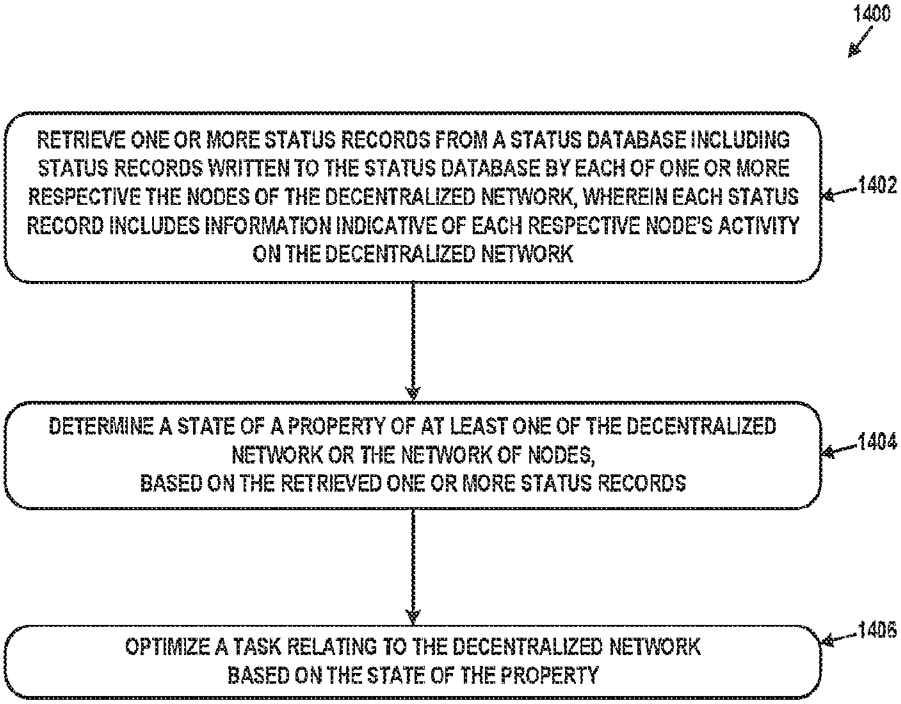
FIG. 14 illustrates a flow chart of an example method involving a blockchain network status database, in accordance with example embodiment.

FIG. 14 is flow charts illustrating an example method 1300 involving a blockchain network status database, in accordance with example embodiments. The method illustrated by FIG. 14 may be carried out by a computing system or computing device configured for operating as a node of a network of nodes operating a decentralized network. In example embodiments, a decentralized network could be a blockchain, and a node could be a node of the blockchain network. Non-limiting examples of the computing system computing system or computing device include computing device 100 or server cluster 204, for example. However, the method can be carried out by other types of devices or device subsystems. For example, the process could be carried out by a portable computer, such as a laptop or a tablet device.

Block 1402 of example method 1400 may involve the node retrieving one or more status records from a status database including status records written to the status database by each of one or more respective the nodes of the decentralized network. Each status record may include information indicative of each respective node's activity on the decentralized network. In accordance with example embodiments, the decentralized network may be a blockchain.

Block 1404 of example method 1400 may involve the node determining a state of a property of at least one of the decentralized network or the network of nodes, based on the retrieved one or more status records.

Finally, block 1406 of example method 1400 may involve the node optimizing a task relating to the decentralized network based on the state of the property.

In accordance with example embodiments, retrieving the one or more status records from the status database may involve entering a request for secure retrieval of the one or more records in a queue configured for queueing requests for secure retrieval of off-network data, where off-network data corresponds to data stored externally to the decentralized network. In an example, requests for secure retrieval of off-network data in the queue may be configured to be serviced by one or more validator nodes of the network that have each successfully validated a previous data block of the decentralized network. The node may then receive information indicating (i) a data storage location from which the requested one or more records can be retrieved, and (ii) that the requested one or more records at the data storage location have been verified by the one or more validator nodes. The node may then retrieve the one or more status records from the data storage location. In accordance with example embodiments, the decentralized network may be a blockchain, the data blocks of the of the decentralized network may be blocks of the blockchain, the validator nodes may be miner nodes, and the off-network data may be or include off-chain data.

In accordance with example embodiments, information indicative of a given node's activity on the decentralized network may include activity/status data, where activity/status data may be: an awake timestamp indicating a most recent time the given node actively joined the network, a seen timestamp indicating a most recent time that the given node actively participated in the network or was connected to another node, a sleep timestamp indicating a most recent time the given node became inactive on the network, an indication of one or more transactions accepted by the given node for inclusion in a previous or future data block of the decentralized network, an indication of one or more successfully validated data blocks accepted by the given node for adding to the decentralized network, and/or an indication of the given node's current view of the decentralized network.

In accordance with example embodiments, activity/status data may further include: an indication of whether the validator solved a data block or was selected to write or validate a data block, an indication of whether the validator has retrieved off-network data, and/or an indication of whether off-network data retrieved by a validator agrees with retrieval by one or more other validator.

In accordance with example embodiments, determining the state of the property of the at least one of the decentralized network or the network of nodes, based on the retrieved one or more status records may involve determining (i) how many and/or which nodes of the network are currently awake and active in the network, (ii) at least one transaction that has been accepted by at least one other node, (iii) at least one data block that has been accepted by at least one other node, (iv) an indication of a longest chain of data blocks of the decentralized network, and/or (v) an indication of any forks in a chain of data blocks of the decentralized network.

In accordance with example embodiments, optimizing the task relating to the decentralized network based on the state of the property may involve carrying out: accepting a transaction that has been accepted by at least one other node, and/or accepting a data block that has been accepted by at least one other node.

In accordance with example embodiments, optimizing the task relating to the decentralized network based on the state of the property may involve accepting a retrieval of off-network data by a verification process.

In accordance with example embodiments, example method 1400 may further involve generating a status record for inclusion in the status database, and writing the generated status record directly to the status database.

In accordance with example embodiments, example method 1400 may further involve generating a status record for inclusion in the status database, and entering, in a queue, a storage request for storing the generated status record in the status database. The queue may be configured for queueing requests for secure storage of off-network data. In this case, off-network data may be or include data stored externally to the decentralized network, and requests for secure storage of off-network data in the queue may be configured to be serviced by one or more validator nodes of the network that have each successfully validated a previous data block of the decentralized network. The node may then receive information confirming that the generated status record has been stored in the status database. The confirmation may include verification of secure storage from the one or more validator nodes.

VIII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting.

What is claimed is:

1. A method carried out by a computing system configured for operating as a validator node of a network of nodes operating a decentralized network, wherein the network of nodes includes a data-entry pool of pending data entries awaiting inclusion in data blocks of the decentralized network, the method comprising:

responsive to successfully writing a data block of the decentralized network, being eligible to perform a secure data retrieval task for the decentralized network;

responsive to being eligible to perform the secure data retrieval task, retrieving, from a queue, a queue entry;

determining, from the queue entry, a data source of off-network data, wherein the data source is external to the network of nodes, and wherein the queue entry includes an indication that the off-network data comprises target content that has already been delivered to the data-entry pool from the data source;

retrieving the off-network data from the data source, wherein retrieving the off-network data from the data source comprises determining that a destination hash value associated with the target content in the data-entry pool agrees with a source hash value associated with the target content at the data source;

generating a cryptographic verification that the validator node carried out the retrieval of the off-network data, wherein generating the cryptographic verification comprises verifying that the validator node confirmed that the source hash value and destination hash value are the same; and storing the off-network data and the cryptographic verification on the decentralized network.

2. The method of claim 1, further comprising:

receiving conveyance data indicating assignment of a conveyance to the validator node for having retrieved, verified, and stored the off-network data.

3. The method of claim 2, wherein the assignment of the conveyance to the validator node is contingent upon the validator node having retrieved, verified, and stored the off-network data.

4. The method of claim 1, wherein the queue is at least one of: the data-entry pool, or a data queue implemented externally to the network of nodes.

5. The method of claim 1, wherein determining that the destination hash value associated with the target content in the data-entry pool agrees with the source hash value associated with the target content at the data source comprises:

applying a hash function to the target content at the data source to derive the source hash value;

applying the hash function to the target content in the data-entry pool to derive the destination hash value; and comparing the source hash value with the destination hash value.

6. The method of claim 1, wherein retrieving the off-network data from the data source comprises retrieving from the data source a first hash value associated with the target content at the data source, wherein storing the off-network data and the cryptographic verification on the decentralized network comprises storing the off-network data and the cryptographic verification in a verification data structure configured for providing authorization for further data entries to be included in future data blocks of the decentralized network, wherein generating the cryptographic verification comprises applying a first hash function to the target content in the data-entry pool to derive a second hash value, and wherein storing the cryptographic verification in the verification data structure comprises storing the first hash value together with the second hash value in the verification data structure.

7. The method of claim 6, wherein the verification data structure comprises a smart contract.

8. The method of claim 1, further comprising:

each of one or more additional validator nodes of the network of nodes, responsive to successfully writing the data block of the decentralized network, being eligible to perform a respective secure data retrieval task for the network;

each of the one or more additional validator nodes, responsive to being respectively eligible to perform the secure data retrieval task, retrieving, from the queue, the queue entry;

each of the one or more additional validator nodes determining, from the queue entry, the data source of the off-network data;

each of the one or more additional validator nodes respectively retrieving the off-network data from the data source;

each respective validator node of the one or more additional validator nodes generating a respective cryptographic verification that the respective validator node carried out the retrieval of the off-network data; and each of the one or more additional validator nodes respectively storing the off-network data and the cryptographic verification on the decentralized network.

9. The method of claim 8, further comprising:

making a determination that a threshold number of the validator node and the one or more additional validator nodes have stored the same data; and responsive to the determination, causing one copy of the off-network data to be included in a subsequent new data block of the decentralized network.

10. The method of claim 1, wherein the data source is a status database comprising status records written to the status database by one or more nodes of the decentralized network, wherein each status record includes information indicative of activity of the node on the network, and wherein retrieving the off-network data from the data source comprises:

retrieving one or more of the status records from the status database; and delivering the one or more of the status records as retrieved directly or indirectly to at least one of the nodes of the network.

11. The method of claim 1, wherein the decentralized network comprises a blockchain, wherein data blocks of the of the decentralized network comprise blocks of the blockchain, wherein the validator node is a miner node, and wherein the off-network data comprises off-chain data.

12. A computing system configured for operating as a validator node of a network of nodes operating a decentralized network, wherein the network of nodes includes a data-entry pool of pending data entries awaiting inclusion in data blocks of the decentralized network, the computing system comprising:

at least one processor; and memory storing instructions that, when executed by the at least one processor, cause the validator node to carry out operations comprising:

responsive to successfully writing a data block of the decentralized network, being eligible to perform a secure data retrieval task for the decentralized network;

responsive to being eligible to perform the secure data retrieval task, retrieving, from a queue, a queue entry;

determining, from the queue entry, a data source of off-network data, wherein the data source is external to the network of nodes, and wherein the queue entry includes an indication that the off-network data comprises target content that has already been delivered to the data-entry pool from the data source;

retrieving the off-network data from the data source, wherein retrieving the off-network data from the data source comprises determining that a destination hash value associated with the target content in the data-entry pool agrees with a source hash value associated with the target content at the data source;

generating a cryptographic verification that the validator node carried out the retrieval of the off-network data, wherein generating the cryptographic verification comprises verifying that the validator node confirmed that the source hash value and destination hash value are the same; and storing the off-network data and the cryptographic verification on the decentralized network.

13. An article of manufacture including a non-transitory computer-readable medium, having stored thereon program instructions that, upon execution by a computing system configured for operating as a validator node of a network of nodes operating a decentralized network, wherein the network of nodes includes a data-entry pool of pending data entries awaiting inclusion in data blocks of the decentralized network, cause the validator node to carry out operations comprising:

responsive to successfully writing a data block of the decentralized network, being eligible to perform a secure data retrieval task for the decentralized network;

responsive to being eligible to perform the secure data retrieval task, retrieving, from a queue, a queue entry;

determining, from the queue entry, a data source of off-network data, wherein the data source is external to the network of nodes, and wherein the queue entry includes an indication that the off-network data comprises target content that has already been delivered to the data-entry pool from the data source;

retrieving the off-network data from the data source, wherein retrieving the off-network data from the data source comprises determining that a destination hash value associated with the target content in the data-entry pool agrees with a source hash value associated with the target content at the data source;

generating a cryptographic verification that the validator node carried out the retrieval of the off-network data, wherein generating the cryptographic verification comprises verifying that the validator node confirmed that the source hash value and destination hash value are the same; and storing the off-network data and the cryptographic verification on the decentralized network.

14. The method of claim 1, wherein the data source and the off-network data at the data source are both external to the decentralized network.

15. The method of claim 1, wherein storing the off-network data and the cryptographic verification on the decentralized network comprises storing the off-network data and the cryptographic verification in a verification data structure configured for providing authorization for further data entries to be included in future data blocks of the decentralized network.

16. The method of claim 1, wherein being eligible to perform the secure data retrieval task comprises receiving an indication of being selected to perform the secure data retrieval task.

* * * * *